US012284206B2

United States Patent
Hittel et al.

(10) Patent No.: US 12,284,206 B2
(45) Date of Patent: *Apr. 22, 2025

(54) SYSTEMS AND METHODS OF DETECTING AND RESPONDING TO RANSOMWARE ON A CLOUD-BASED FILE STORAGE SYSTEM BY IDENTIFYING A VOLUME OF CHANGES IN THE FILES STORED ON THE CLOUD-BASED FILE STORAGE SYSTEM

(71) Applicant: Netskope, Inc., Santa Clara, CA (US)

(72) Inventors: Sean Hittel, Calgary (CA); Krishna Narayanaswamy, Saratoga, CA (US); Ravindra K. Balupari, San Jose, CA (US); Ravi Ithal, Fremont, CA (US)

(73) Assignee: Netskope, Inc., Santa Clara, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 17/537,433

(22) Filed: Nov. 29, 2021

(65) Prior Publication Data

US 2022/0166781 A1 May 26, 2022

Related U.S. Application Data

(63) Continuation of application No. 16/673,922, filed on Nov. 4, 2019, now Pat. No. 11,190,540, which is a
(Continued)

(51) Int. Cl.
*H04L 29/06* (2006.01)
*G06F 16/907* (2019.01)
(Continued)

(52) U.S. Cl.
CPC .......... *H04L 63/145* (2013.01); *G06F 16/907* (2019.01); *G06F 21/552* (2013.01);
(Continued)

(58) Field of Classification Search
CPC . H04L 63/145; H04L 63/1433; G06F 21/552; G06F 21/565; G06F 21/566; G06F 16/907
See application file for complete search history.

(56) References Cited

U.S. PATENT DOCUMENTS

| 5,440,723 A | 8/1995 | Arnold et al. |
| 5,452,460 A | 9/1995 | Distelberg et al. |

(Continued)

FOREIGN PATENT DOCUMENTS

| EP | 1063833 A2 | 12/2000 |
| JP | 2011234178 A | 11/2011 |

OTHER PUBLICATIONS

Scaife et al "Cryptolock and Drop It: Stopping Ransomware Attacks on User Data", Jun. 2016, IEEE 36th International conference on Distributed Computing Systems (Year: 2016).*
(Continued)

*Primary Examiner* — Noura Zoubair

(57) ABSTRACT

The technology disclosed relates to detecting a ransomware attack on a cloud-based file storage system. The detecting includes collecting metadata on files at they are manipulated, storing the collected metadata as historical metadata, detecting multiple artifacts of the ransomware attack resulting from ransomware manipulation of the files by (i) comparing at least one of the extension, the magic number and the size included in the historical metadata to at least one of the extension, the magic number and the size included in current metadata of the files to identify a volume of changes in the files, and (ii) detecting that the identified volume of changes exceeds a change volume to determine that the ransomware attack is in progress, and identifying a user/machine that manipulated the files and responding to the determination that the ransomware attack is in progress by
(Continued)

restricting further manipulation of other files by the identified user/machine.

20 Claims, 12 Drawing Sheets

Related U.S. Application Data continuation of application No. 15/628,551, filed on Jun. 20, 2017, now Pat. No. 10,469,525.

(60) Provisional application No. 62/373,288, filed on Aug. 10, 2016.

(51) Int. Cl.
*G06F 21/55* (2013.01)
*G06F 21/56* (2013.01)
*H04L 9/40* (2022.01)

(52) U.S. Cl.
CPC ........ *G06F 21/565* (2013.01); *H04L 63/1433* (2013.01); *G06F 21/566* (2013.01); *G06F 2221/2101* (2013.01)

(56) References Cited

U.S. PATENT DOCUMENTS

| | | |
|---|---|---|
| 6,513,122 B1 | 1/2003 | Magdych et al. |
| 6,622,248 B1 | 9/2003 | Hirai |
| 7,080,408 B1 | 7/2006 | Pak et al. |
| 7,298,864 B2 | 11/2007 | Jones |
| 7,376,719 B1 | 5/2008 | Shafer et al. |
| 7,735,116 B1 | 6/2010 | Gauvin |
| 7,966,654 B2 | 6/2011 | Crawford |
| 8,000,329 B2 | 8/2011 | Fendick et al. |
| 8,296,178 B2 | 10/2012 | Hudis et al. |
| 8,346,580 B2 | 1/2013 | Nakfoor |
| 8,365,243 B1 | 1/2013 | Lu et al. |
| 8,677,448 B1 | 3/2014 | Kauffman et al. |
| 8,793,151 B2 | 7/2014 | DelZoppo et al. |
| 8,839,417 B1 | 9/2014 | Jordan |
| 8,856,869 B1 | 10/2014 | Brinskelle |
| 9,069,955 B2 | 6/2015 | Dolph et al. |
| 9,197,601 B2 | 11/2015 | Pasdar |
| 9,197,628 B1 | 11/2015 | Hastings |
| 9,225,734 B1 | 12/2015 | Hastings |
| 9,231,968 B2 | 1/2016 | Fang et al. |
| 9,246,944 B1 | 1/2016 | Chen |
| 9,280,678 B2 | 3/2016 | Redberg |
| 9,317,686 B1* | 4/2016 | Ye .................... G06F 21/568 |
| 9,692,759 B1 | 6/2017 | Chandrasekhar |
| 9,811,662 B2 | 11/2017 | Sharpe et al. |
| 9,917,817 B1 | 3/2018 | Lad et al. |
| 10,084,825 B1 | 9/2018 | Xu |
| 10,162,767 B2 | 12/2018 | Spurlock et al. |
| 10,237,282 B2 | 3/2019 | Nelson et al. |
| 10,248,797 B1 | 4/2019 | Shinde et al. |
| 10,334,442 B2 | 6/2019 | Vaughn et al. |
| 10,382,468 B2 | 8/2019 | Dods |
| 10,469,525 B2 | 11/2019 | Hittel et al. |
| 10,476,907 B2 | 11/2019 | Hittel et al. |
| 10,484,334 B1 | 11/2019 | Lee et al. |
| 10,826,941 B2 | 11/2020 | Jain et al. |
| 10,860,730 B1 | 12/2020 | Weaver et al. |
| 11,032,301 B2 | 6/2021 | Mandrychenko et al. |
| 11,036,856 B2 | 6/2021 | Graun et al. |
| 11,089,064 B1 | 8/2021 | Sarukkai et al. |
| 11,178,172 B2 | 11/2021 | Hittel et al. |
| 11,190,540 B2 | 11/2021 | Hittel et al. |
| 11,281,775 B2 | 3/2022 | Burdett et al. |
| 2002/0099666 A1 | 7/2002 | Dryer et al. |
| 2003/0055994 A1 | 3/2003 | Herrmann et al. |
| 2003/0063321 A1 | 4/2003 | Inoue et al. |
| 2003/0172292 A1 | 9/2003 | Judge |
| 2003/0204632 A1 | 10/2003 | Willebeek-Lemair et al. |
| 2004/0015719 A1 | 1/2004 | Lee et al. |
| 2005/0010593 A1 | 1/2005 | Fellenstein et al. |
| 2005/0271246 A1 | 12/2005 | Sharma et al. |
| 2006/0156401 A1 | 7/2006 | Newstadt et al. |
| 2007/0006293 A1 | 1/2007 | Balakrishnan et al. |
| 2007/0204018 A1 | 8/2007 | Chandra et al. |
| 2007/0237147 A1 | 10/2007 | Quinn et al. |
| 2008/0047013 A1* | 2/2008 | Claudatos ............. G06F 21/568 |
| | | 726/24 |
| 2008/0069480 A1 | 3/2008 | Aarabi et al. |
| 2008/0134332 A1 | 6/2008 | Keohane et al. |
| 2009/0144818 A1 | 6/2009 | Kumar et al. |
| 2009/0249470 A1 | 10/2009 | Litvin et al. |
| 2009/0300351 A1 | 12/2009 | Lei et al. |
| 2010/0017436 A1 | 1/2010 | Wolge |
| 2010/0251369 A1 | 9/2010 | Grant |
| 2011/0119481 A1 | 5/2011 | Auradkar et al. |
| 2011/0145594 A1 | 6/2011 | Jho et al. |
| 2011/0321170 A1 | 12/2011 | Onodera et al. |
| 2012/0278896 A1 | 11/2012 | Fang et al. |
| 2013/0145483 A1 | 6/2013 | Dimuro et al. |
| 2013/0159694 A1 | 6/2013 | Chiueh et al. |
| 2013/0298190 A1 | 11/2013 | Sikka et al. |
| 2013/0347085 A1 | 12/2013 | Hawthorn et al. |
| 2014/0007182 A1 | 1/2014 | Qureshi et al. |
| 2014/0013112 A1 | 1/2014 | Cidon et al. |
| 2014/0026182 A1 | 1/2014 | Pearl et al. |
| 2014/0068030 A1 | 3/2014 | Chambers et al. |
| 2014/0068705 A1 | 3/2014 | Chambers et al. |
| 2014/0259093 A1 | 9/2014 | Narayanaswamy et al. |
| 2014/0259190 A1 | 9/2014 | Kiang et al. |
| 2014/0269279 A1 | 9/2014 | Ismail et al. |
| 2014/0282843 A1 | 9/2014 | Buruganahalli et al. |
| 2014/0317681 A1 | 10/2014 | Shende |
| 2014/0337862 A1 | 11/2014 | Valencia et al. |
| 2014/0344573 A1 | 11/2014 | Tsai et al. |
| 2014/0359282 A1 | 12/2014 | Shikfa et al. |
| 2014/0366079 A1 | 12/2014 | Pasdar |
| 2014/0380491 A1 | 12/2014 | Abuelsaad et al. |
| 2015/0074744 A1 | 3/2015 | McLean et al. |
| 2015/0100357 A1 | 4/2015 | Seese et al. |
| 2015/0135302 A1 | 5/2015 | Cohen et al. |
| 2015/0271207 A1 | 9/2015 | Jaiswal et al. |
| 2016/0275577 A1 | 9/2016 | Kolluri Venkata Sesha et al. |
| 2016/0323318 A1 | 11/2016 | Terrill et al. |
| 2016/0350145 A1 | 12/2016 | Botzer et al. |
| 2017/0064005 A1 | 3/2017 | Lee |
| 2017/0093917 A1 | 3/2017 | Chandra et al. |
| 2017/0250951 A1 | 8/2017 | Wang et al. |
| 2017/0286696 A1* | 10/2017 | Shetty ................... H04L 9/0822 |
| 2017/0353496 A1 | 12/2017 | Pai et al. |
| 2017/0359725 A1* | 12/2017 | Bolte .................. H04W 12/037 |
| 2018/0034835 A1* | 2/2018 | Iwanir ................ H04L 63/1416 |
| 2018/0324204 A1 | 11/2018 | McClory et al. |
| 2020/0050686 A1 | 2/2020 | Kamalapuram et al. |
| 2020/0372040 A1 | 11/2020 | Boehmann et al. |
| 2021/0367976 A1 | 11/2021 | Khurshid et al. |

OTHER PUBLICATIONS

"Cloud Data Loss Prevention Reference Architecture", Netskope, Sep. 2015, WP-88-1, 2 pages.
"Data Breach: The Cloud Multiplier Effect", Ponemon Institute, Jun. 4, 2014, 27 pages.
"Netskope Introspection," netSkope, Inc., 2015, 3 pgs.
"Netskope The 15 Critical CASB Use Cases", Netskope Inc., EB-141-1, dated 2015, 19 pages.
"The Netskope Active Platform Enabling Safe Migration to the Cloud", Apr. 2015, DS-1-8, Netskope, Inc., 6 pages.
"The Netskope Advantage: Three "Must-Have" Requirements for Cloud Access Security Brokers", Jul. 2015, WP-12-2 1 pages.
Cheng et al., "Cloud Security for Dummies, Netskope Special Edition," John Wiley & Sons, Inc., dated 2015, 53 pages.
Kark et al, "Trends: Calculating the Cost of a Security Breach", Forrester Research, Inc. Apr. 10, 2007, 7 pgs.
Liu et al., Data Loss Prevention, IT Professional, vol. 12, Issue 2, IEEE, Mar. 29, 2010, pp. 10-13.

(56) References Cited

OTHER PUBLICATIONS

Netskope, "The 5 Steps to Cloud Confidence", Version 2, Jan. 29, 2014, 10 pages.
Oasis, Key Management Interoperability Protocols Use Cases Version 1.2, dated Mar. 18, 2013, 132 pages.
Pandire et al., Attack Detection in Cloud Virtual Environment and Prevention using Honeypot, International Conference Un Inventive Research in Computing Applications {ICIRCA), IEEE, Jul. 11-12, 2018, pp. 515-520.
Office Action in U.S. Appl. No. 17/527,150, mailed Feb. 29, 2024, 23 pages.
Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.
Huckaby, Jeff "Ending Clear Text Protocols," Rackaid.com, Dec. 9, 2008, 3 pgs.
Newton, Harry "fabric," Newton's Telecom Dictionary, 30th Updated, Expanded, Anniversary Edition, 2016, 3 pgs.
Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.
Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.
Mccullagh, Declan, "How safe is instant messaging? A security and privacy survey," CNET, Jun. 9, 2008, 14 pgs.
Beck et al., "IBM and Cisco: Together for a World Class Data Center," IBM Redbooks, Jul. 2013, 654 pgs.
Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54/.
Zetter, Kim, "Revealed: The Internet's Biggest Security Hole," Wired, Aug. 26, 2008, 13 pgs.
Adya et al., "Farsite: Federated, available, and reliable storage for an incompletely trusted environment," SIGOPS Oper. Syst. Rev. 36, SI, Dec. 2002, pp. 1-14.
Agrawal et al., "Order preserving encryption for numeric data," In Proceedings of the 2004 ACM SIGMOD international conference on Management of data, Jun. 2004, pp. 563-574.
Balakrishnan et al., "A layered naming architecture for the Internet," ACM SIGCOMM Computer Communication Review, 34(4), 2004, pp. 343-352.
Downing et al., Naming Dictionary of Computer and Internet Terms, (11th Ed.) Barron's, 2013, 6 pgs.
Downing et al., Dictionary of Computer and Internet Terms, (10th Ed.) Barron's, 2009, 4 pgs.
Zoho Mail, "Email Protocols: What they are & their different types," 2006, 7 pgs. available at https://www.zoho.com/mail/glossary/email-protocols.html#:~: text=mode of communication.-,What are the different email protocols%3F, and also has defined functions.
NIIT, Special Edition Using Storage Area Networks, Que, 2002, 6 pgs.
Chapple, Mike, "Firewall redundancy: Deployment scenarios and benefits," TechTarget, 2005, 5 pgs. available at https://www.techtarget.com/searchsecurity/tip/Firewall-redundancy-Deployment-scenarios-and-benefits?Offer=abt_pubpro_AI-Insider.
Fortinet, FortiGate—3600 User Manual (vol. 1, Version 2.50 MR2) Sep. 5, 2003, 329 pgs.
Fortinet, FortiGate SOHO and SMB Configuration Example, (Version 3.0 MR5), Aug. 24, 2007, 54 pgs.
Fortinet, FortiSandbox—Administration Guide, (Version 2.3.2), Nov. 9, 2016, 191 pgs.
Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.
Fortinet, FortiOS—Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/10.1007/978-3-319-61863-0_5.
Lee et al., "A Data Mining Framework for Building Intrusion Detection Models," Columbia University, n.d. 13 pgs.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al., "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&p. 2000, May 2000, pp. 44-55.
Dean, Tamara, Guide to Telecommunications Technology, Course Technology, 2003, 5 pgs.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management For Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.

* cited by examiner

SYSTEMS AND METHODS OF DETECTING AND RESPONDING TO RANSOMWARE ON A CLOUD-BASED FILE STORAGE SYSTEM BY IDENTIFYING A VOLUME OF CHANGES IN THE FILES STORED ON THE CLOUD-BASED FILE STORAGE SYSTEM

CROSS-REFERENCE TO OTHER APPLICATIONS

This application is a continuation of Non-provisional U.S. application Ser. No. 16/673,922, entitled "SYSTEMS AND METHODS OF DETECTING AND RESPONDING TO RANSOMWARE ON A FILE SYSTEM", filed on Nov. 4, 2019 which is a continuation of Non-provisional U.S. application Ser. No. 15/628,551, entitled "SYSTEMS AND METHODS OF DETECTING AND RESPONDING TO MALWARE ON A FILE SYSTEM", filed on Jun. 20, 2017 which claims priority to and the benefit of U.S. Provisional Application No. 62/373,288, entitled "SYSTEMS AND METHODS OF DETECTING AND RESPONDING TO A DATA ATTACK ON A FILE SYSTEM", filed on Aug. 10, 2016. The non-provisional and priority applications are incorporated by reference for all purposes.

This application is related to U.S. Nonprovisional patent application Ser. No. 15/628,547 entitled "SYSTEMS AND METHODS OF DETECTING AND RESPONDING TO A DATA ATTACK ON A FILE SYSTEM," filed contemporaneously. The related application is incorporated by reference for all purposes.

INCORPORATIONS

The following materials have been incorporated by reference in this filing:

Cheng, Ithal, Narayanaswamy, and Malmskog. *Cloud Security For Dummies, Netskope Special Edition*. John Wiley & Sons, Inc. 2015, "Netskope Introspection" by netSkope, Inc., "Data Loss Prevention and Monitoring in the Cloud" by netSkope, Inc., "The 5 Steps to Cloud Confidence" by netSkope, Inc., "Netskope Active Cloud DLP" by netSkope, Inc., "Repave the Cloud-Data Breach Collision Course" by netSkope, Inc., "Netskope Cloud Confidence Index™" by netSkope, Inc., "SYSTEMS AND METHODS OF MONITORING AND CONTROLLING ENTERPRISE INFORMATION STORED ON A CLOUD COMPUTING SERVICE (CCS)", U.S. Nonprovisional patent application Ser. No. 14/835,640, filed on Aug. 25, 2015, and "SECURITY FOR NETWORK DELIVERED SERVICES", U.S. Nonprovisional patent application Ser. No. 14/198,508, filed on Mar. 5, 2014 (now U.S. Pat. No. 9,270,765 issued Feb. 23, 2016).

FIELD OF THE TECHNOLOGY DISCLOSED

The technology disclosed generally relates to detecting and responding to a data attack on a file system stored on an independent data store, and more particularly relates to identifying and determining whether recently modified files on an independent data store (e.g., a cloud drive) have been the subject of malicious activity, such as ransomware, and responding to the malicious activity by implementing a response mechanism.

BACKGROUND

The subject matter discussed in this section should not be assumed to be prior art merely as a result of its mention in this section. Similarly, any problems or shortcomings mentioned in this section or associated with the subject matter provided as background should not be assumed to have been previously recognized in the prior art. The subject matter in this section merely represents different approaches, which in and of themselves can also correspond to implementations of the claimed technology.

Sharing content from the cloud has never been easier. The challenge is that without visibility and control over what is being shared and with whom is the content being shared with, there is an increased risk that content stored on the cloud can become the subject of malicious activity, such as malware.

The use of cloud services for a number of corporate functions is now common. Thus, instead of installing servers within a corporate network to store corporate data or run a customer relationship management (CRM) software product, customized or off the shelf cloud storage solutions and software as a service (SaaS) solutions such as Salesforce.com's offerings can be used. The information technology (IT) and network architecture approaches that could log and protect access to a classic non-cloud based solutions provide limited control. The sprawl of "bring your own devices" (BYODs) and the need to haul that traffic back to the enterprise make it less attractive. For example, virtual private network (VPN) solutions are used to control access to the protected corporate network. Proxies (both transparent and explicit) may be used to filter, or limit access to undesirable web sites when the client is accessing the web sites from within the corporate network. Similar filtering software can be installed on client computers, e.g. safe browsing software, to enforce limits on access so as to reduce the likelihood of malware infecting cloud-based storage. A viable solution should provide consistent, centrally administered control, e.g. enforce the same security measures across multiple devices, network services, and networks—including corporate networks.

Data is often the lifeblood of any business and it is critical that it is effectively managed, protected, and meets compliance needs. Protecting data in the past was focused primarily on on-premise scenarios, but now with the increased adoption of cloud services, companies of all sizes are now relying on the cloud to create, edit, and store data. This presents new challenges. Despite its benefits, the cloud also makes it easy for people to lose sensitive corporate data as the result of malicious activity, such as malware. For one thing, people can access cloud services from multiple devices more easily. Another is that the cloud services make it easy to share data, including with people outside of an organization. For these reasons, it is easy for data to get out of an organization's control.

As the number of cloud-based services increases exponentially, there is an exponential increase in the possibility of a data attack by malware, and more specifically, by ransomware. Ransomware is a computer malware that installs on a user's local endpoint and then executes an attack on the user's local endpoint by encrypting the user's files and then demanding a ransom for the user's files to be decrypted. Ransomware propagates via electronic media and networks. Examples of media that can carry a ransomware infection are email, exploit kits, removable drives, and external network shares. Ransomware often encrypts files to ensure that the victim pays the ransom to get the decryption keys.

Users can unknowingly spread ransomware through the sync and share mechanisms provided by the cloud-based services. Passive spread of ransomware and other infections among users that rely on file sync, share, and collaboration presents an increasing risk.

Virlock is a ransomware infection that encrypts files and also infects them, thereby making it a polymorphic file infector ransomware. Any user who opens a Virlock infected file spreads the infection, causing their files to become encrypted and infected, including files synced through cloud-based services. Virlock ransomware presents a new propagation vector that has the ability to deliver malware on the fly and substantially amplify malware fan-out effect.

Regarding the corporate infiltration of ransomware, the Institute of Critical Infrastructure Technology (ICIT) has said that "2016 is the year ransomware will wreak havoc on America's critical infrastructure community" (ICIT, http://icitech.org/wp-content/uploads/2016/03/ICIT-Brief-The-Ransomware-Report2.pdf, August 2016). The Kaspersky Security Bulletin 2015 reports that in 2015 Kaspersky Lab solutions detected ransomware on more than 50,000 computer in corporate networks, which is more than double the figure for 2014 (Kaspersky Lab, Kaspersky Security Bulletin 2015). This same report explains that the real number of incidents is several times higher. CNN money reports that in the first quarter of 2016, cyber-criminals have collected $209 million by extorting business and institutions to unlock computer servers infected with ransomware. The Federal Bureau of Investigation (FBI) estimates that at this rate, ransomware is on pace to be a $1 billion crime in 2016 (CNN-money, http://money.cnn.com/2016/04/15/technology/ransomware-cyber-security/, Apr. 15, 2016).

Accordingly, while it is imperative to facilitate the use of cloud services and more specifically cloud storage so that people can continue to be productive and use the best tools for the job, it is just as important to detect and implement appropriate response mechanisms to prevent individual users and corporations from being held hostage to ransomware.

BRIEF SUMMARY OF THE TECHNOLOGY DISCLOSED

Aspects of the present disclosure are to address at least the above-mentioned problems and/or disadvantages and to provide at least the advantages described below. Accordingly, an aspect of the present disclosure is to provide method, non-transitory computer-readable recording medium and apparatus for detecting and responding to a data attack on a file system stored on an independent data store.

In accordance with an aspect of the present disclosure a method of detecting and responding to a data attack on a local file system of a local device synchronized to a file system of an independent data store is provided. The method includes repeatedly scanning a list to identify files in the local file system of the independent data store that have been updated within a determined timeframe, reading a payload of respective files identified by the scanning, calculating current content properties for the respective files from the payload of the respective files, and accessing a historical content properties store storing historical content properties to obtain the historical content properties assembled based on read payloads of the respective files, wherein the stored historical content properties are maintained independently from and not under control of the local file system and the file system of the independent data store and the historical content properties store preserves generations of content properties describing files in the file system such that prior generation content properties remain available after a file and file content properties have been updated in the file system. Further, the method includes determining, by a client agent on the local device, that a malicious activity is in process by analyzing the current content properties of the respective files and the historical content properties of the respective files to identify a pattern of changes between the current content properties and the historical content properties of the respective files that exceeds a predetermined change velocity, determining, by the client agent, that the malicious activity is in process by analyzing the current content properties of the respective files and known patterns of malicious content properties that indicate a known malicious file modification to identify a match between the current content properties of the respective files and the known patterns of malicious content properties that indicate the known malicious file modification, determining a machine and/or user that initiated the malicious activity, and responsive to the determining of the machine and/or user that initiated the malicious activity, implementing a response mechanism that restricts file modifications to the local file system of the local device and the file system of the independent data store by the determined machine and/or user.

In accordance with an aspect of the present disclosure a method of detecting and responding to a data attack on a file system stored on an independent data store is provided. The method includes repeatedly scanning a list to identify files in the file system of the independent data store that have been updated within a determined timeframe, assembling current metadata for respective files identified by the scanning, the current metadata assembled from file system lists for and file headers of the respective files, accessing a historical metadata store storing historical metadata to obtain the historical metadata of the respective files, wherein the stored historical metadata is maintained independently from and not under control of the file system and the historical metadata store preserves generations of metadata describing files in the file system such that prior generation metadata remains available after a file and file metadata have been updated in the file system, and determining, by an inspective agent or an active agent, that a malicious activity is in process (i) when the historical metadata does not exist for the respective files and (ii) when a pattern of the current metadata of the respective files exceeds a predetermined threshold. Further, the method includes determining, by the inspective agent or the active agent, that the malicious activity is in process by analyzing the current metadata of the respective files and known patterns of malicious metadata that indicate a known malicious file modification to identify a match between the current metadata of the respective files and the known patterns of malicious metadata that indicate the known malicious file modification, determining a machine and/or user that initiated the malicious activity, and responsive to the determining of the machine and/or user that initiated the malicious activity, implementing a response mechanism that restricts file modifications by the determined machine and/or user.

In accordance with an aspect of the present disclosure a method of detecting and responding to a data attack on a file system stored on an independent data store is provided. The method includes repeatedly scanning a list to identify files in the file system of the independent data store that have been updated within a determined timeframe, reading a payload of respective files identified by the scanning, calculating current content properties for the respective files from the payload of the respective files, accessing a historical content properties store storing historical content properties to obtain the historical content properties assembled based on read payloads of the respective files, wherein the stored historical content properties are maintained independently from and not under control of the file system and the historical content properties store preserves generations of content properties describing files in the file system such that prior generation content properties remain available after a file and file content properties have been updated in the file system, and determining, by an inspective agent or an active agent, that a malicious activity is in process (i) when the historical content properties do not exist for the respective files and (ii) when a pattern of the current content properties of the respective files exceeds a predetermined threshold. Further, the method includes determining, by the inspective agent or the active agent, that the malicious activity is in process by analyzing the current content properties of the respective files and known patterns of malicious content properties that indicate a known malicious file modification to identify a match between the current content properties of the respective files and the known patterns of malicious content properties that indicate the known malicious file modification, determining a machine and/or user that initiated the malicious activity, and responsive to the determining of the machine and/or user that initiated the malicious activity, implementing a response mechanism that restricts file modifications by the determined machine and/or user.

In accordance with other aspects of the present disclosure, non-transitory computer-readable recording mediums are provided, where the non-transitory computer-readable recording mediums have instructions recorded thereon that, when executed, cause at least one processor to perform each of the above-describe three methods. Further, in accordance with other aspects of the present disclosure, various systems and/or apparatuses are provided that include specific hardware structure for performing features similar to each of the above-described three methods.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Introduction

Figure 1:
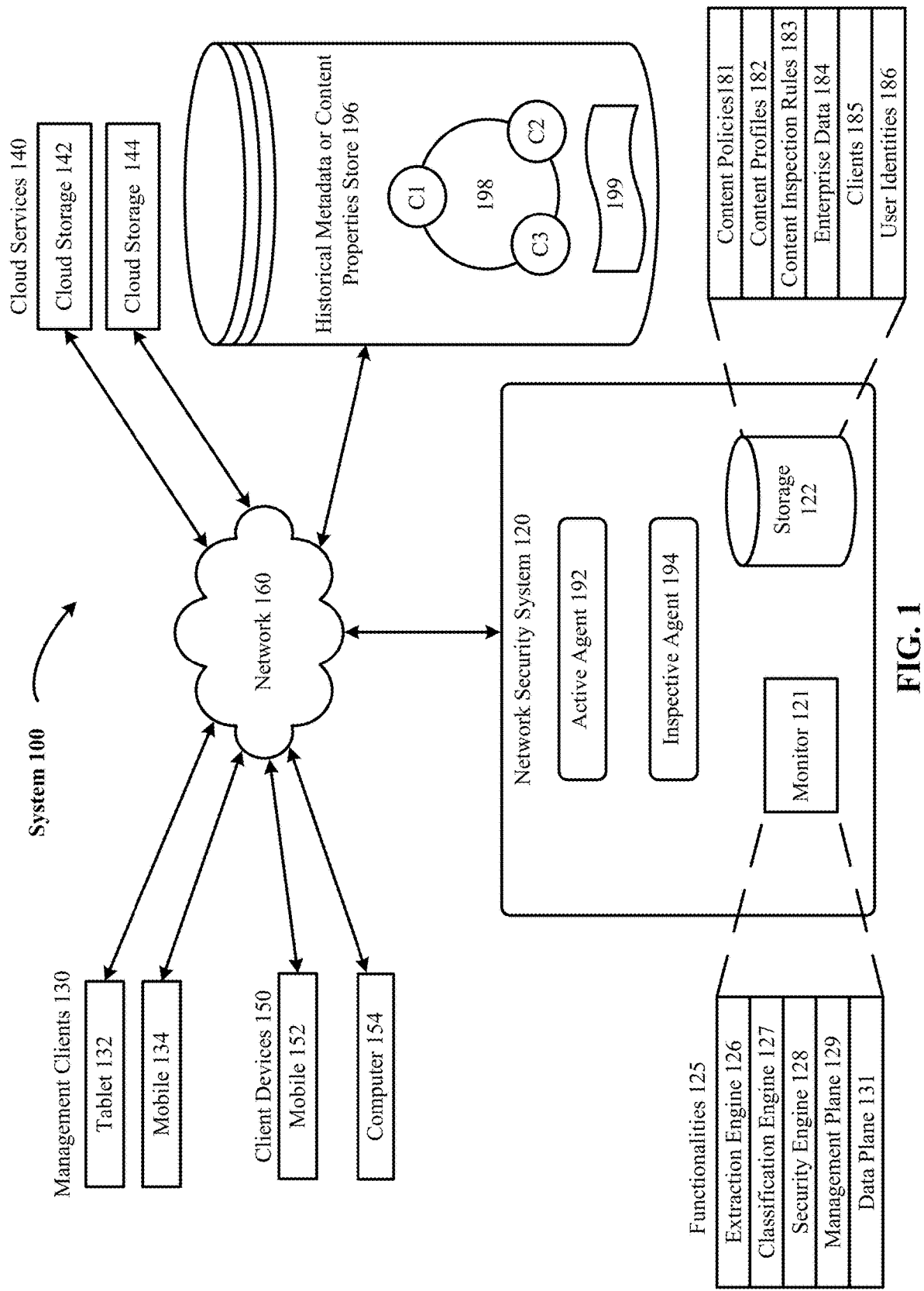
FIG. 1 illustrates an architectural level schematic of a system in accordance with an implementation.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Content inspection has come a long way in the past several years. Whether it is the knowledge and understanding of different file types (from video to even the most obscure binary files) or the reduction of false positives through proximity matching, the industry has cracked a lot of the code and IT and businesses are better off as a result.

One constant technical problem that has remained true, however, is the fact that you cannot inspect content you cannot see. For example, there are more than 153 cloud storage providers today and the average organization, according to the *Netskope Cloud Report*, is using only 34 of them. Considering IT are typically unaware of 90% of the cloud applications running in their environment, this means that there is content in 30 plus cloud applications and associated cloud-based storage that IT has no knowledge of.

Due to the large volume of files stored on the cloud, it is not realistic to scan each file for the purpose of detecting ransomware and there has yet to be a reasonable solution for identifying files stored in the cloud that have been infected with malware. The technology disclosed solves this technical problem by using an inspective agent that inspects recently updated content stored in the cloud on a cloud drive (e.g., an independent data store). Additionally, the technology disclosed solves this technical problem by using an active agent that inspects real-time transactions as content is being stored and/or updated on the cloud drive. The technology discloses solves this technical problem by using a client agent installed locally on devices that communicate with the cloud drive, such that files stored locally can be inspected before they are transmitted to the cloud drive. The inspective agent, the active agent and the client agent can be deployed stand-alone or alongside one another.

Terminology

Independent Data Store: Herein, a hosted service or a cloud service or a cloud application or a cloud storage provider or a cloud storage application or a cloud computing service (CCS) is referred to as an "independent data store", and vice-versa. Examples of common cloud services today include Salesforce.com™, Box™, Dropbox™, Google Apps™, Amazon Web Services (AWS™), Microsoft Office 365™, Workday™, Oracle on Demand™, Taleo™, Yammer™, and Concur™. Cloud services provide functionality to users that is implemented in the cloud and that is the target of policies, e.g. logging in, editing documents, downloading bulk data, reading customer contact information, entering payables, deleting documents, in contrast to the offerings of a simple website and ecommerce sites. Note that some consumer facing websites, e.g. Facebook™ and Yammer™, which offer social networks are the type of cloud service considered here. Some services, e.g. Google's Gmail™ can be a hybrid with some free users using the application generally while other corporations use it as a cloud service. Note that implementations can support both web browser clients and application clients that use URL-based Application Programming Interfaces (APIs). Thus, using Dropbox™ as an example, user activity on the Dropbox™ website, as well as activity of the Dropbox™ client on the computer could be monitored.

Application Programming Interface: An "application programming interface (API)" is defined as a packaged collection of code libraries, routines, protocols methods and fields that belong to a set of classes, including its interface types. The API defines the way that developers and programmers can use the classes for their own software development, just by importing the relevant classes and writing statements that instantiate the classes and call their methods and fields. In another implementation, an API is a source code based specification intended to be used as an interface by software components to communicate with each other. An API can include specifications for routines, data structures, object classes and variables. Basically, an API provides an interface for developers and programmers to access the underlying platform capabilities and features of online social networks. Implementations of the technology disclosed include different types of APIs, including web service APIs such as hypertext transfer protocol (HTTP) or HTTPs based APIs like simple object access protocol (SOAP), Bulk, extensible markup language (XML)-remote procedure call (RPC) and java script object notation (JSON)-RPC and representational state transfer (REST) APIs (e.g., Flickr™, Google Static Maps™, Google Geolocation™), web socket APIs, library-based APIs like JavaScript and TWAIN (e.g., Google Maps™ JavaScript API, Dropbox™ JavaScript Data store API, Twilio™ APIs, Oracle Call Interface (OCI)), class-based APIs (objet orientation) like Java API and Android API (e.g., Google Maps™ Android API, Microsoft developer network (MSDN) Class Library for .NET Framework, Twilio™ APIs for Java and C#), OS functions and routines like access to file system and access to user interface, object remoting APIs like common object request broker architecture (CORBA) and .NET Remoting and hardware APIs like video acceleration, hard disk drives and peripheral component interconnect (PCI) buses. Other examples of APIs used by the technology disclosed include Box Content API™, Microsoft Graph™, Dropbox API™, Dropbox API v2™, Dropbox Core API™, Dropbox Core API v2™, Facebook Graph API™, Foursquare API™, Geonames API™, Force.com API™, Force.com Metadata API™, Apex API™, Visualforce API™, Force.com Enterprise WSDL™ Salesforce.com Streaming API™, Salesforce.com Tooling API™, Google Drive API™, Drive REST API™, AccuWeather API™, aggregated-single API like CloudRail™ API, and others.

Mobile and Tablet vs. Computer: Portions of the specification may make distinctions between two types of client devices used by users to access cloud services. The primary distinction is between the mechanisms for coupling the client device to the network security system. In relation to client devices, the term "computer" will refer to more open systems where the network security system can more directly install software and modify the networking stack. Similarly, in relation to client devices, the terms "mobile" or "tablet" will refer to more closed systems where the network security system options for modifying the network stack are more limited. This terminology mirrors the situation today where computer-client devices running Mac OS X, Windows desktop versions, Android, and/or Linux can be more easily modified than mobile or tablet devices running iOS, and/or Windows Mobile. Thus, the terminology refers to how third-party operating system vendor limitations are addressed to provide access to the network security system as opposed to a fundamental technical difference between the types of client devices. Further, if mobile OS vendors open their systems further, it is likely that the distinction could be eliminated with more classes of client devices using the implementation described in the computer-client discussions. Additionally, it can be the case that certain server computers and other computing devices within an organization can have the client installed to cover machine-to-machine communications.

A closely related point is that some clients interface with the network security system differently. The browser add-on clients, for example, redirect the browsers to an explicit proxy. Only the traffic needed to apply the policy to is rerouted and it is done so within the application. The traffic arriving at the network security system can have the user identity embedded in the data or within the secure tunnel headers, e.g. additional headers or secure sockets layer (SSL) client side certificates in some implementations. Other clients redirect select network traffic through transparent proxies. For these connections, some traffic beyond exactly those requests needed by the policy can be routed to the network security system. Further, the user identity information is generally not within the data itself, but rather established by the client in setting up a secure tunnel to the network security system.

User Identity: User identity, or user identification, in the context of this specification refers to an indicator that is provided by the network security system to the client device. It can be in the form of a token, a unique identifier such as a universally unique identifier (UUID), a public-key certificate, or the like. In some implementations, the user identity can be linked to a specific user and a specific device; thus, the same individual can have a different user identity on their mobile phone vs. their computer. The user identity can be linked to an entry or userid corporate identity directory, but is distinct from it. In one implementation, a cryptographic certificate signed by the network security is used as the user identity. In other implementations, the user identity can be solely unique to the user and be identical across devices.

Encryption Key: An encryption key or a key, as used herein, refers to a code or number which, when taken together with an encryption algorithm, defines a unique transformation used to encrypt or decrypt data.

System Overview

A system and various implementations for providing security for cloud-based delivered services and storage are disclosed. The system and implementations are described with reference to FIG. 1 showing an architectural level schematic of the system. Because FIG. 1 is an architectural diagram, certain details are intentionally omitted to improve the clarity of the description. The discussion of FIG. 1 will be organized as follows. First, the elements of the figure will be described, followed by their interconnections. Then, the use of the elements in the system will be described in greater detail.

FIG. 1 includes the system 100. The system 100 includes a network security system 120, management clients 130, cloud services 140 including cloud storage 142, 144 on an independent data store, client devices 150, and a network 160. The network security system 120 includes an active agent 192, an inspective agent 194, a monitor 121, and storage 122. The storage 122 stores, among other things, content policies 181, content profiles 182, content inspection rules 183, enterprise data 184, clients 185, and user identities 186. In some implementations, the storage 122 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

Enterprise data 184 can include organizational data, including but not limited to, intellectual property, non-public financials, strategic plans, customer lists, personally identifiable information belonging to customers or employees, patient health data, source code, trade secrets, booking information, partner contracts, corporate plans, merger and acquisition documents, and other confidential data. In particular, the term "enterprise data" refers to a document, a file, a folder, a webpage, a collection of webpages, an image, or any other text-based document.

The network security system 120 can be viewed as providing several functionalities 125; key among them are the active agent 192, inspective agent 194, extraction engine 126, classification engine 127, security engine 128, management plane 129, and a data plane 131. The management clients 130 include tablet 132 and mobile device 134.

The interconnection of the elements of system 100 will now be described. The network 160 couples the tablet 132, the mobile device 134, the mobile device 152, the computer 154, the cloud storage 142, the cloud storage 144, and the network security system 120 in communication (indicated by solid lines). The cloud storage 142 and 144 may also be described as an independent data store. The actual communication path can be point-to-point over public and/or private networks. All of the communications can occur over a variety of networks, e.g. private networks, VPN, multi-protocol label switching (MPLS) circuit, or Internet, and can use appropriate APIs and data interchange formats, e.g. REST, JSON, XML, SOAP and/or java message service (JMS). All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as enhanced data rates for global system for mobile communication (GSM) evolution (EDGE), 3G, 4G long term evolution (LTE), Wi-Fi, and worldwide interoperability for microwave access (WiMAX). Additionally, a variety of authorization and authentication techniques, such as username/password, OAuth, Kerberos, SecureID, digital certificates, and more, can be used to secure the communications.

Monitor 121 and storage 122 can include one or more computers and computer systems coupled in communication with one another. They can also be one or more virtual computing and/or storage resources. For example, monitor 121 can be one or more Amazon elastic compute cloud (EC2) instances and storage 122 can be an Amazon simple storage service (S3) storage. Other computing-as-service platforms such as Force.com from Salesforce, Rackspace, or Heroku could be used rather than implementing network security system 120 on direct physical computers or traditional virtual machines. Additionally, to implement the functionalities 125 one or more engines can be used and one or more points of presence (POPs) can be established. The engines can be of varying types including a workstation, server, computing cluster, blade server, server farm, or any other data processing system or computing device. The engine can be communicably coupled to the databases via a different network connection. For example, the extraction engine 126 can be coupled via the network(s) 160 (e.g., the Internet), classification engine 127 can be coupled via a direct network link and security engine 128 can be coupled by yet a different network connection. In other examples, the data plane 131 POPs can be distributed geographically and/or co-hosted with particular cloud services. Similarly, the management plane 129 POPs can be distributed geographically. The two types of POPs can be either separately hosted or co-hosted as well.

Having described the elements of FIG. 1 and their interconnections, elements of the figure will now be described in greater detail. The network security system 120 provides a variety of functionalities 125 via a management plane 129 and a data plane 131. Data plane 131 includes an extraction engine 126, a classification engine 127, and a security engine 128, according to one implementation. Other functionalities, e.g. control plane, can also be provided. These functionalities 125 collectively provide secure interfacing with the cloud services 140 by client devices 150. Although we use the term network security system to describe network security system 120, more generally the system provides application visibility and control functions as well as security.

The management clients 130 according to one implementation are computing devices with a web browser with a secure, web-delivered interface provided by the network security system 120 to define and administer content policies 181. The network security system 120 according to some implementations is a multi-tenant system, so a user of a management client can only change content policies 181 associated with her organization. In some implementations, APIs can be provided for programmatically defining and or updating policies. In such implementations, the management clients 130 can include one or more servers, e.g. a corporate identities directory such as a Microsoft Active Directory, pushing updates, and/or responding to pull requests for updates to the content policies 181. Both systems can co-exist; for example, some companies may use a corporate identities directory to automate identification of users within the organization while using a web interface for tailoring policies to their needs. Management clients 130 are assigned roles and access to the network security system 120 data is controlled based on roles, e.g. read-only vs. read-write.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

System Architecture

As discussed, supra, the functionalities 125 of the network security system 120 are divided into different groups: active agent 192, inspective agent 194, extraction engine 126, classification engine 127, security engine 128, etc. Additionally, a control plane may be used along with or instead of management plane 129 and data plane 131. The specific division of functionality between these groups is an implementation choice. Similarly, the functionality can be highly distributed across a number of points of presence (POPs) to improve locality, performance, and/or security. For example, either component of the network security system 120 can be co-located with cloud services or with corporate networks.

Inspective agent 194 leverages API connections to inspect content that is already resident in the cloud storage 142, 144, irrespective of when the content was uploaded or when it was created. In particular, the cloud storage 142, 144 is communicably interfaced with network 160 via an API through which content from the cloud storage 142, 144 and metadata about the content is observed, listened to, monitored, tracked, collected, aggregated, assembled, retrieved, etc. Such content is, for example, files, folders, documents, images, and videos and content metadata is, for example, file or folder level details like who the file or folder owner is, which cloud application is hosting the file or folder, when was the file or folder created, posted, edited, modified, an audit trail of user activity, version history, file type, and others. In other implementations, the collected content metadata provides details on file exposure, including whether files are private, shared internally, shared externally with specific people or shared publicly via a link. This metadata can be obtained for each file and/or content on the cloud storage 142, 144 based on information assembled from a file system list for the respective files and/or content and from file headers of the respective files and/or contents. Additionally, content properties of the payloads of the respective files can be obtained for the respective files and/or contents. The obtained metadata and the obtained content properties of the respective files stored on the cloud storage 142, 144 can be stored on a historical metadata or content properties store 196 as historical metadata and historical content properties.

The historical metadata or content properties store 196 stores the historical metadata of the respective files and stores the historical content properties of the respective files. In an implementation, the historical metadata or content properties store 196 is maintained independently from and not under control of the file system and the historical metadata or content properties store 196 preserves generations of metadata describing files in the file system, such that prior generation metadata remains available after a file and file metadata have been updated in the file system and/or preserves generations of content properties describing files in the file system, such that prior generation content properties remains available after a file and file content properties have been updated in the file system. Accordingly, the historical metadata or content properties store 196 includes historical metadata and/or historical content properties for each of the files stored on the cloud storage 142, 144.

Further, during or after the transmission of files and/or contents from management clients 130 and client devices 150 to the cloud storage 142, 144 via the network 160, the inspective agent 194 can (repeatedly) scan the files and/or contents or scan a list of the files and/or contents to identify files and/or contents in the file system of the cloud storage 142, 144 that have been updated within a determined time frame. The inspective agent 194 can also assemble the metadata and/or content properties for the files identified by the scanning from the file system lists, the file headers and the payloads. The assembled metadata and/or content properties of the files and/or contents that have been updated within the determined time frame can be identified as current metadata and current content properties. The current metadata and current content properties can be compared to the historical metadata and historical content properties to determine whether or not malware (e.g., malicious activity) is present on the cloud storage 142, 144.

Specifically, the inspective agent 194 can determine whether or not malicious activity is in process by analyzing the current metadata and/or content properties of the respective files and the historical metadata and/or content properties of the respective files to identify a pattern of changes from the historical metadata and/or content properties to the current metadata and/or content properties that exceeds a predetermined change velocity. The predetermined change velocity can be, for example, a 5% increase in entropy of the content properties and or metadata, combined with, for example a change in edit distance of the filename and/or, for example, a hamming distance of an LSH being greater than 40. Further, the predetermined change velocity can evolve based on other factors and can be based on percentages of change where some types of metadata and/or content properties have a higher or lower weighted value as opposed to other types of metadata and/or content properties. The predetermined change velocity can also be a combination of percentages and raw or weighted values. As an alternative to identifying a pattern of changes that exceeds a predetermined change velocity, a pattern/volume of changes that exceeds a predetermined change volume can be identified to determine whether or not malicious activity is in process. The predetermined change volume can be based on, for example a number of files that have changes or a cumulative number of changes for each file and/or the entire group of files, where some types of changes have a higher impact on the pattern/volume of changes than other types of changes.

Additionally, the inspective agent 194 can determine whether or not malicious activity is in process by analyzing the current metadata and/or current content properties of the respective files/contents and known patterns of malicious metadata and/or malicious content properties that indicate a known malicious file modification to identify a match between the current metadata and/or content properties of the respective files and the known patterns of malicious metadata and/or content properties that indicate the known malicious file modification.

After determining that malicious activity is in process, the inspective agent 194 can invoke or facilitate a determination of a machine and/or user that initiated the malicious activity. Additionally, after determining the machine and/or user that initiated the malicious activity, the inspective agent 194 can invoke or facilitate an implementation of a response mechanism that restricts file modifications by the determined machine and/or user.

In one implementation, inspective agent 194 includes a data aggregator (omitted to improve clarity). Data aggregator includes listener capable of listening to streams and data flows originating at the cloud storage 142, 144 by connecting with the API via the public Internet. In some implementations, listener includes heterogeneous instances responsible for the intake of content (e.g., content properties) and content metadata from the cloud storage 142, 144. Listener listens for both structured data, such as values and keywords returned from the APIs, and also listens for unstructured data, such as text in logs and so forth. In some implementations, listener includes a miner for performing a pull from the APIs and a crawler for other cloud storage which do not expose a public API. In one implementation, to consume data from APIs, listener provides a push API with a valid endpoint. This endpoint can take the form of an HTTP/HTTPS server, a user datagram protocol (UDP) socket, or a message queue listener (e.g., Apache Kafka™, RabbitMQ™, ActiveMQ™, and others). The listener can also throttle messages as necessary to ensure none are dropped.

According to an implementation, inspective agent 194 includes a handler component (omitted to improve clarity) that is configured to receive the content and content metadata over the network 160 and an application protocol layer, or other higher protocol layer, such as HTTP protocol layer, among many possible standard and proprietary protocol layers. These higher protocol layers can encode, package and/or reformat data for sending and receiving messages over a network layer, such as Internet Protocol (IP), and/or a transport layer, such as Transmission Control Protocol (TCP) and/or (UDP).

In some implementations, the gathered content properties and/or content metadata is processed and/or normalized. In some instances, metadata includes structured data and functionality targets specific data constructs provided by the cloud storage 142, 144. Non-structured data, such as free text, can also be provided by, and targeted back to, the cloud storage 142, 144. Both structured and non-structured data are capable of being aggregated by the inspective agent 194. For instance, the assembled metadata is stored in a semi-structured data format like a JSON (JavaScript Option Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects are stored in a schema-less or NoSQL key-value metadata store, such as the historical metadata or content properties store 196 like Apache Cassandra™ 198, Google's BigTable™, HBase™, Voldemort™, CouchDB™, MongoDB™, Redis™, Riak™, Neo4j™, etc., which stores the parsed JSON objects using keyspaces that are equivalent to a database in SQL. Each keyspace is divided into column families that are similar to tables and comprise of rows and sets of columns.

In one implementation shown in system 100, as content properties or content metadata are aggregated, they are stored in a NoSQL key-value column store distributed storage system, such as the historical metadata or content properties store 196, like Cassandra™ 198. Metadata or content properties sent to Cassandra™ 198 is spread out across many nodes or commodity servers C1-C3, connections to which can be made using a Java, Scala, Ruby, Clojure or Python based APIs (e.g., Hector, Pelops, cassandra query language (CQL), Thrift, Phpcassa, PyCassa, etc.). Cassandra™ 198 stores metadata or content properties in units called columns. Each column is a tuple, a list of associated data elements. The basic column format can be represented as (name, value, timestamp). For brevity, the timestamp, while an essential element of the column, is often not written. Thus, an example column may be written (UserName, User-1). An optional level of hierarchy called a super column incorporates any number of columns. Moving up a level, keys (sometimes referred to as rows) are tuples consisting of a name and one or more columns or super columns. An example key is written as (Status_Key, (UserName, User-1), (Logged_In, Y). Any number of keys is grouped into a column family. Analogously, a group of column families is referred to as the keyspace, the final level of hierarchy. Two pseudocode representations of the relationship are constructed as follows:

[keyspace] [column family] [key] [column]
[keyspace] [column family] [key] [super column] [column]

A more detailed description of distributed key-value storage systems is found in the following papers: *Cassandra—A Decentralized Structured Storage System*, Avinash Lakshman and Prashant Malik, 2009; *Dynamo: Amazon's Highly Available Key-value Store*, Giuseppe DeCandia, Deniz Hastorun, Madan Jampani, Gunavardhan Kakulapati, Avinash Lakshman, Alex Pilchin, Swaminathan Sivasubramanian, Peter Vosshall, and Werner Vogels, SOSP '07, Oct. 14-17, 2008; and Bigtable: *A Distributed Storage System for Structured Data*, Fay Chang, Jeffrey Dean, Sanjay Ghemawat, Wilson C. Hsieh, Deporah A. Wallach, Mike Burrows, Tushar Chandra, Andrew Fikes, and Robert E. Gruber, Operating Systems Design and Implementation (OSDI), 2006; all of which are incorporated by reference herein.

In other implementations, content metadata and content properties are stored in a Hadoop distributed file system (HDFS) like Hadoop cluster 199.

In an implementation, inspective agent 194 includes a metadata and content properties parser (omitted to improve clarity) that analyzes incoming metadata and content properties and identifies keywords, events, user IDs, locations, demographics, file type, timestamps, and so forth within the data received. Parsing is the process of breaking up and analyzing a stream of text into keywords, or other meaningful elements called "targetable parameters". In one implementation, a list of targeting parameters becomes input for further processing such as parting or text mining, for instance, by a matching engine (not shown). Parsing extracts meaning from available metadata. In one implementation, tokenization operates as a first step of parsing to identify granular elements (e.g., tokens) within a stream of metadata, but parsing then goes on to use the context that the token is found in to determine the meaning and/or the kind of information being referenced. Because metadata and content properties analyzed by inspective agent 194 are not homogenous (e.g., there are many different sources in many different formats), certain implementations employ at least one metadata parser per cloud service, and in some cases more than one.

In other implementations, inspective agent 194 uses monitor 121 to inspect the cloud storage 142, 144 and assemble the historical metadata and/or content properties and the current metadata and/or current content properties, as described above.

Active agent 192 monitors metadata and content properties in real-time using monitor 121 when content traverses the network 160 inline. Monitor 121 performs content inspection (CI) on the cloud storage transactions and traffic via the application programming interfaces (APIs) by identifying each cloud storage 142, 144 interfacing with an organization's network.

Monitor 121 can employ different techniques to perform CI. In one implementation, it can use pattern matching that includes scanning for strings or generic bit and byte patterns anywhere in the packets. In another implementation, it can use behavioral analysis which includes scanning for patterns in the communication behavior of a cloud service, including absolute and relative packet sizes, per-flow data and packet rates, number of flows and new flow rate per cloud service. In yet another implementation, it can use statistical analysis that includes the calculation of statistical indicators that identify transmission types (e.g. media files, instant messages, or content transfer), including mean, median, and variation of values collected as part of the behavioral analysis.

After the metadata and/or content properties are extracted, it is organized into data sets and stored as lists, tuples, dictionaries, tables, and/or sets in the historical metadata or content properties store 196, according to one implementation.

The classification engine 127 can then issue commands (e.g. structured query language (SQL) statements, backus normal form (BNF) statements) to the database to retrieve and view the data. Additional programs and command can be executed to derive relationships between the data elements in the tables of the relational database. Supplementary data contained in other tables in the relational database can be combined with the extracted content, according to one implementation.

Classification engine 127 evaluates the extracted content, content metadata and/or content properties according to the applicable content policies 181, content profiles 182, and content inspection rules 183. In one implementation, a packet can match a content inspection rule if the characteristics of the packet satisfy conditions of the content inspection rule and qualify as content subject to content control. In particular, classification engine 127 compares the extracted content with the arguments defined in the applicable standard search pattern or the custom search pattern (as discussed infra) by using a plurality of similarity measures.

The following discussion outlines some examples of the similarity measures used by the classification engine 127 to determine whether strings in extracted content match one of the applicable content inspection rules. One example of a similarity measure is unigram overlap. The baseline unigram approach considers two strings to be similar if they have higher Jaccard similarity than a threshold. The Jaccard coefficient between the unigrams is used to measure the similarity of the pair of strings. In some implementations, Jaccard similarity between two strings can be conditional upon the presence of certain essential tokens. In another implementation, an edit distance technique can be used to determine the similarity between strings. The edit distance between two strings is considered, that is, two strings are a match if the number of edits to transform one string into the other is less than some threshold value. In some implementations, a Levenshtein distance can be used as a metric for measuring the amount of difference between two strings. The distance is the minimum number of edits required in order to transform one string into the other.

In other implementations, different similarity measures can be used to determine similarity such as Euclidean distance, Cosine similarity, Tanimoto coefficient, Dice coefficient, Hamming distance, Needleman-Wunch distance or Sellers Algorithm, Smith-Waterman distance, Gotoh Distance or Smith-Waterman-Gotoh distance, Block distance or L1 distance or City block distance, Monge Elkan distance, Jaro distance metric Jaro Winkler, SoundEx distance metric, Matching Coefficient, Dice Coefficient, Overlap Coefficient, Variational distance, Hellinger distance or Bhattacharyya distance, Information Radius (Jensen-Shannon divergence) Harmonic Mean, Skew divergence, Confusion Probability, Tau, Fellegi and Sunters (SFS) metric, FastA, BlastP, Maximal matches, q-gram, Ukkonen Algorithms and Soergel distance.

Security engine 128 accesses content policies 181 to identify security actions to be performed. In some implementations, the security engine 128 includes a plurality of sub-engines.

While monitor 121 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

As discussed above regarding the inspective agent 194, the metadata can be obtained for each file and/or content on the cloud storage 142, 144 based on information assembled from a file system list for the respective files and/or content and from file headers of the respective files and/or contents. Additionally, content properties of the payloads of the respective files can be obtained for the respective files and/or contents. The obtained metadata and the obtained content properties of the respective files stored on the cloud storage 142, 144 can be stored on a historical metadata or content properties store 196 as historical metadata and historical content properties.

The historical metadata or content properties store 196 stores the historical metadata of the respective files and stores the historical content properties of the respective files. In an implementation, the historical metadata or content properties store 196 is maintained independently from and not under control of the file system and the historical metadata or content properties store 196 preserves generations of metadata describing files in the file system, such that prior generation metadata remains available after a file and file metadata have been updated in the file system and/or preserves generations of content properties describing files in the file system, such that prior generation content properties remains available after a file and file content properties have been updated in the file system. Accordingly, the historical metadata or content properties store 196 includes historical metadata and/or historical content properties for each of the files stored on the cloud storage 142, 144.

Further, during the transmission of files and/or contents from management clients 130 and client devices 150 to the cloud storage 142, 144 via the network 160, the active agent 192 can scan the files and/or contents inline to identify files and/or contents that have been updated within a determined time frame. The active agent 192 can also assemble the metadata and/or content properties for the files identified by the scanning from the file system lists, the file headers and the content properties; this can be done inline during the transmission of the files and/or contents, as opposed to the inspective agent 194 that performs this assembling after the transfer. The assembled metadata and/or content properties of the files and/or contents that have been updated within the determined time frame can be identified as current metadata and current content properties. The current metadata and current content properties can be compared to the historical metadata and historical content properties to determine whether or not malware (e.g., malicious activity) is present on the cloud storage 142, 144.

Specifically, the active agent 192 can determine whether or not malicious activity is in process by analyzing the current metadata and/or content properties of the respective files and the historical metadata and/or content properties of the respective files to identify a pattern of changes from the historical metadata and/or content properties to the current metadata and/or content properties that exceeds a predetermined change velocity. The predetermined change velocity can be, for example, a 5% increase in entropy of the content properties and or metadata, combined with, for example a change in edit distance of the filename and/or, for example, a hamming distance of an LSH being greater than 40. Further, the predetermined change velocity can evolve based on other factors and can be based on percentages of change where some types of metadata and/or content properties have a higher or lower weighted value as opposed to other types of metadata and/or content properties. The predetermined change velocity can also be a combination of percentages and raw or weighted values. As an alternative to identifying a pattern of changes that exceeds a predetermined change velocity, a pattern/volume of changes that exceeds a predetermined change volume can be identified to determine whether or not malicious activity is in process. The predetermined change volume can be based on, for example a number of files that have changes or a cumulative number of changes for each file and/or the entire group of files, where some types of changes have a higher impact on the pattern/volume of changes than other types of changes.

Additionally, the active agent 192 can determine whether or not malicious activity is in process by analyzing the current metadata and/or current content properties of the respective files/contents and known patterns of malicious metadata and/or malicious content properties that indicate a known malicious file modification to identify a match between the current metadata and/or content properties of the respective files and the known patterns of malicious metadata and/or content properties that indicate the known malicious file modification.

After determining that malicious activity is in process, the active agent 192 can invoke or facilitate a determination of a machine and/or user that initiated the malicious activity. Additionally, after determining the machine and/or user that initiated the malicious activity, the active agent 192 can invoke or facilitate an implementation of a response mechanism that restricts file modifications by the determined machine and/or user.

Furthermore, the above-described operations of the active agent 192 and the inspective agent 194 can be similarly performed by a client agent (not illustrated) that is locally installed and/or has access to the management clients 130 and/or the client devices 150. The client agent can perform these operations alone or in conjunction with the active agent 192 and/or the inspective agent 194. The above-described operations of the active agent 192, the inspective agent 194 and the client agent can be performed simultaneously by each of the three agents or by any combination thereof. Further, the various metadata and content properties described above can be shared among the three agents and by each of the three agents. For example, information collected by the inspective agent 194 can be shared by the active agent 192 and the client agent while performing operations simultaneously or at different times, and so on.

Active Analysis Example

Figure 2:
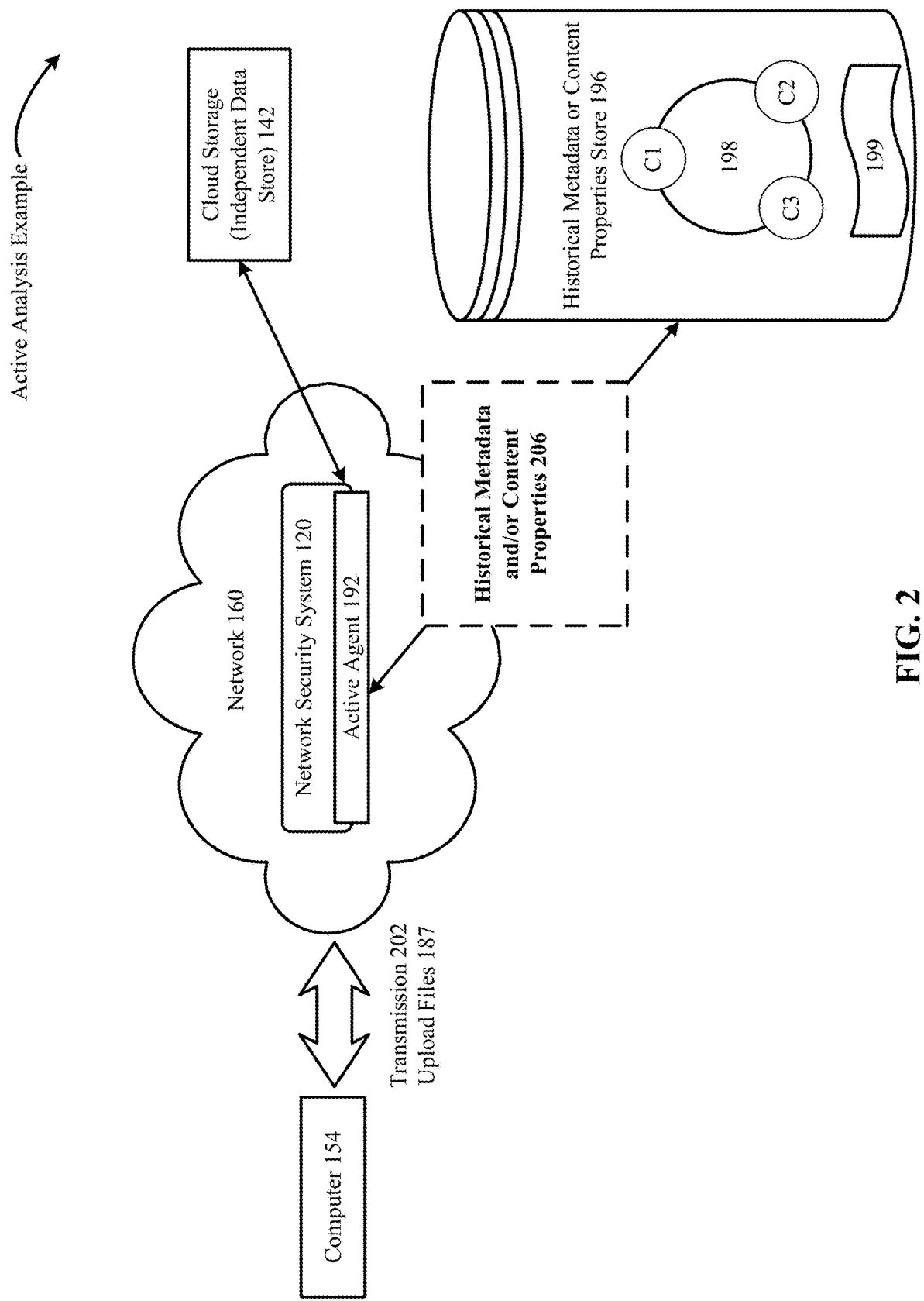
FIG. 2 illustrates one implementation of an active agent detecting malicious activity during a transfer of data to an independent data store.

FIG. 2 depicts one implementation of an active agent 192 of a network security system 120 detecting malicious activity during a transfer of data to an independent data store via a network 160, using historical metadata and/or historical content properties stored on a historical metadata or content properties store 196. In FIG. 2, a client, such as a computer 154 attempts to perform a transmission 202 by uploading/updating files 187 on the cloud storage 142 (e.g., an independent data store). Before the files 187 are transmitted/updated on the cloud storage 142, the active agent 192 will obtain current metadata and/or current content properties for the files 187 from the headers and/or payloads of the files 187.

The historical metadata or content properties store 196 stores the historical metadata and/or historical content properties 206 of the files. In an implementation, the historical metadata or content properties store 196 is maintained independently from and not under control of the file system and the historical metadata or content properties store 196 preserves generations of metadata describing files in the file system, such that prior generation metadata remains available after a file and file metadata have been updated in the file system and/or preserves generations of content properties describing files in the file system, such that prior generation content properties remains available after a file and file content properties have been updated in the file system. Accordingly, the historical metadata or content properties store 196 includes historical metadata and/or historical content properties 206 for each of the files stored on the cloud storage 142.

The active agent 192 then compares the current metadata and/or current content properties to the historical metadata and/or historical content properties 206 to determine whether or not malware (e.g., malicious activity) is present on the files 187.

Specifically, the active agent 192 can determine whether or not malicious activity is in process by analyzing the current metadata and/or content properties of the files 187 and the historical metadata and/or historical content properties 206 of the files 187 to identify a pattern of changes from the historical metadata and/or historical content properties 206 to the current metadata and/or content properties that exceeds a predetermined change velocity. Some of the historical metadata and/or historical content properties 206 of the files 187 can be information previously collected by the inspective agent 194 and/or collected by the inspective agent 194 running concurrently with the active agent 192. In other words, metadata and/or content properties can be shared between the active agent 192 and the inspective agent 194.

Additionally, the active agent 192 can determine whether or not malicious activity is in process by analyzing the current metadata and/or current content properties of the files 187 and known patterns of malicious metadata and/or malicious content properties that indicate a known malicious file modification to identify a match between the current metadata and/or content properties of the files 187 and the known patterns of malicious metadata and/or content properties that indicate the known malicious file modification.

After determining that malicious activity is in process, the active agent 192 can invoke or facilitate a determination of a machine (e.g., computer 154) and/or user that initiated the malicious activity. Additionally, after determining the machine and/or user that initiated the malicious activity, the active agent 192 can invoke or facilitate an implementation of a response mechanism that restricts file modifications by the determined machine and/or user.

Inspective Analysis Example

Figure 3:
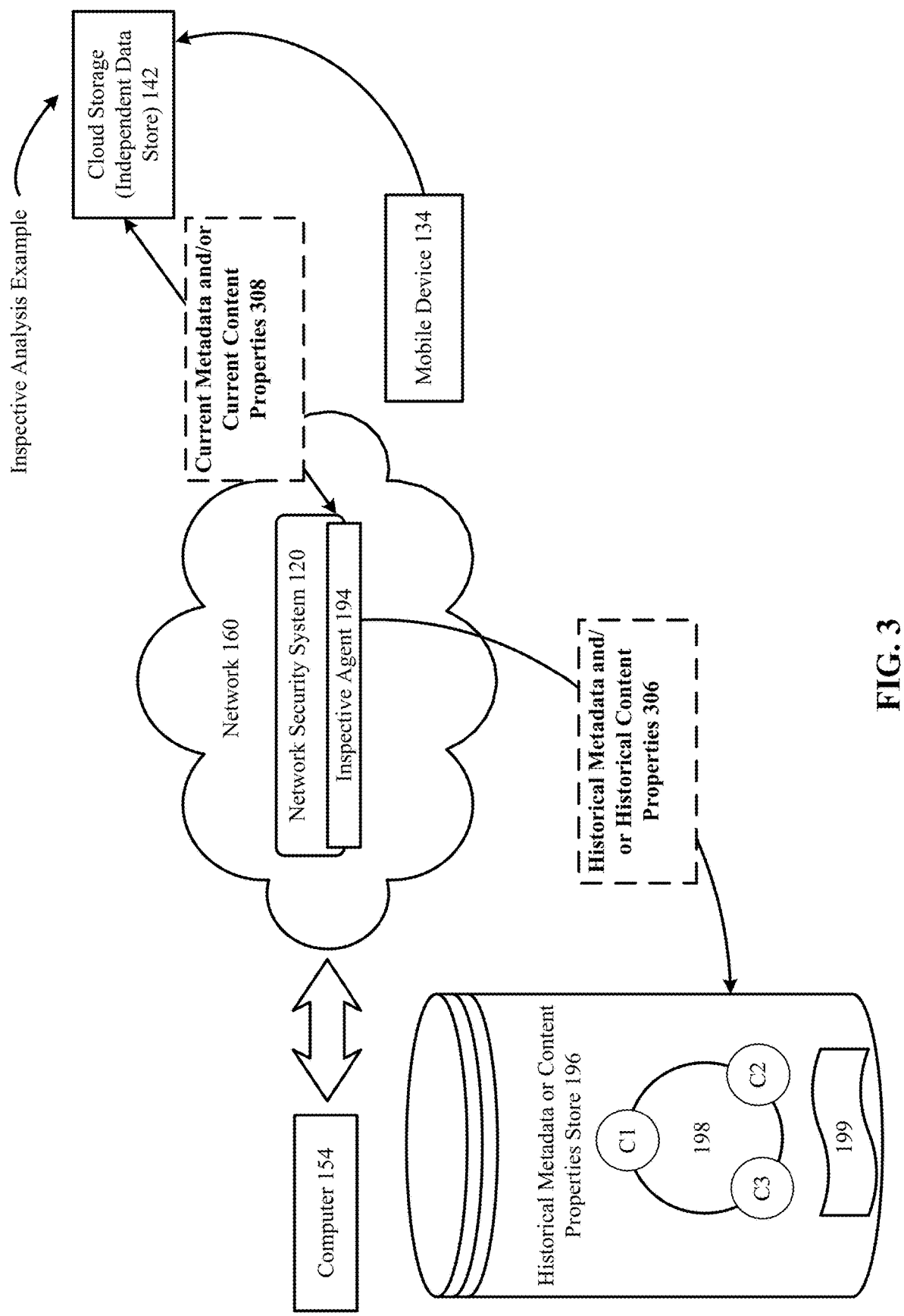
FIG. 3 depicts one implementation of an inspective agent detecting malicious activity on an independent data store.

FIG. 3 depicts one implementation of an inspective agent 194 of a network security system 120 performing inspective analysis of files stored on an independent data store, such as cloud storage 142. As discussed supra, the inspective agent 194 inspects content that resides in the cloud storage 142 after the content has been uploaded/updated on the cloud storage 142. Specifically, the inspective agent 194 detects malicious activity using historical metadata and/or historical content properties 306 stored on a historical metadata or content properties store 196 and using current metadata and/or current content properties 308 obtained from files stored on the cloud storage 142. In FIG. 3, a client, such as a computer 154 may update/transfer files to the cloud storage 142 via the network 160 and a mobile device 134 may update/transfer files to the cloud storage 142 via a network other than the network 160. One of the advantages of the inspective agent 194 is that malicious activity can detected by analyzing files updated and/or transferred to the cloud storage 142 outside of the network 160.

The historical metadata or content properties store 196 stores the historical metadata and/or historical content properties 306 of respective files. The historical content properties can be obtained from payloads of the respective files. In an implementation, the historical metadata or content properties store 196 is maintained independently from and not under control of the file system and the historical metadata or content properties store 196 preserves generations of the metadata and/or content properties describing files in the file system, such that prior generation metadata and/or content properties remain available after a file and file metadata and/or content properties have been updated in the file system. Accordingly, the historical metadata or content properties store 196 includes historical metadata and/or historical content properties 306 for each of the files stored on the cloud storage 142.

Further, during or after the transmission of files from the computer 154 and the mobile device 134 to the cloud storage 142, the inspective agent 194 can (repeatedly) scan the files 142 or scan a list of the files to identify file in the file system of the cloud storage 142 that have been updated within a determined time frame. The inspective agent 194 can also assemble the current metadata and/or current content properties 308 for the files identified by the scanning from the file system lists, the file headers and the payloads. The current metadata and/or current content properties 308 can be compared to the historical metadata and historical content properties 306 to determine whether or not malware (e.g., malicious activity) is present on the cloud storage 142.

Specifically, the inspective agent 194 can determine whether or not malicious activity is in process by analyzing the current metadata and/or current content properties 308 of the respective files and the historical metadata and/or historical content properties 306 of the respective files to identify a pattern of changes from the historical metadata and/or historical content properties 306 to the current metadata and/or current content properties 308 that exceeds a predetermined change velocity.

Some of the historical metadata and/or historical content properties 306 of the files can be information previously collected by the active agent 192 and/or collected by the active agent 192 running concurrently with the inspective agent 194. In other words, metadata and/or content properties can be shared between the active agent 192 and the inspective agent 194.

Additionally, the inspective agent 194 can determine whether or not malicious activity is in process by analyzing the current metadata and/or current content properties 308 of the respective files and known patterns of malicious metadata and/or malicious content properties that indicate a known malicious file modification to identify a match between the current metadata and/or current content properties 308 of the respective files and the known patterns of malicious metadata and/or content properties that indicate the known malicious file modification.

After determining that malicious activity is in process, the inspective agent 194 can invoke or facilitate a determination of a machine (e.g., the computer 154 or mobile device 134) and/or user that initiated the malicious activity. Additionally, after determining the machine and/or user that initiated the malicious activity, the inspective agent 194 can invoke or facilitate an implementation of a response mechanism that restricts file modifications by the determined machine and/or user.

Figure 4:
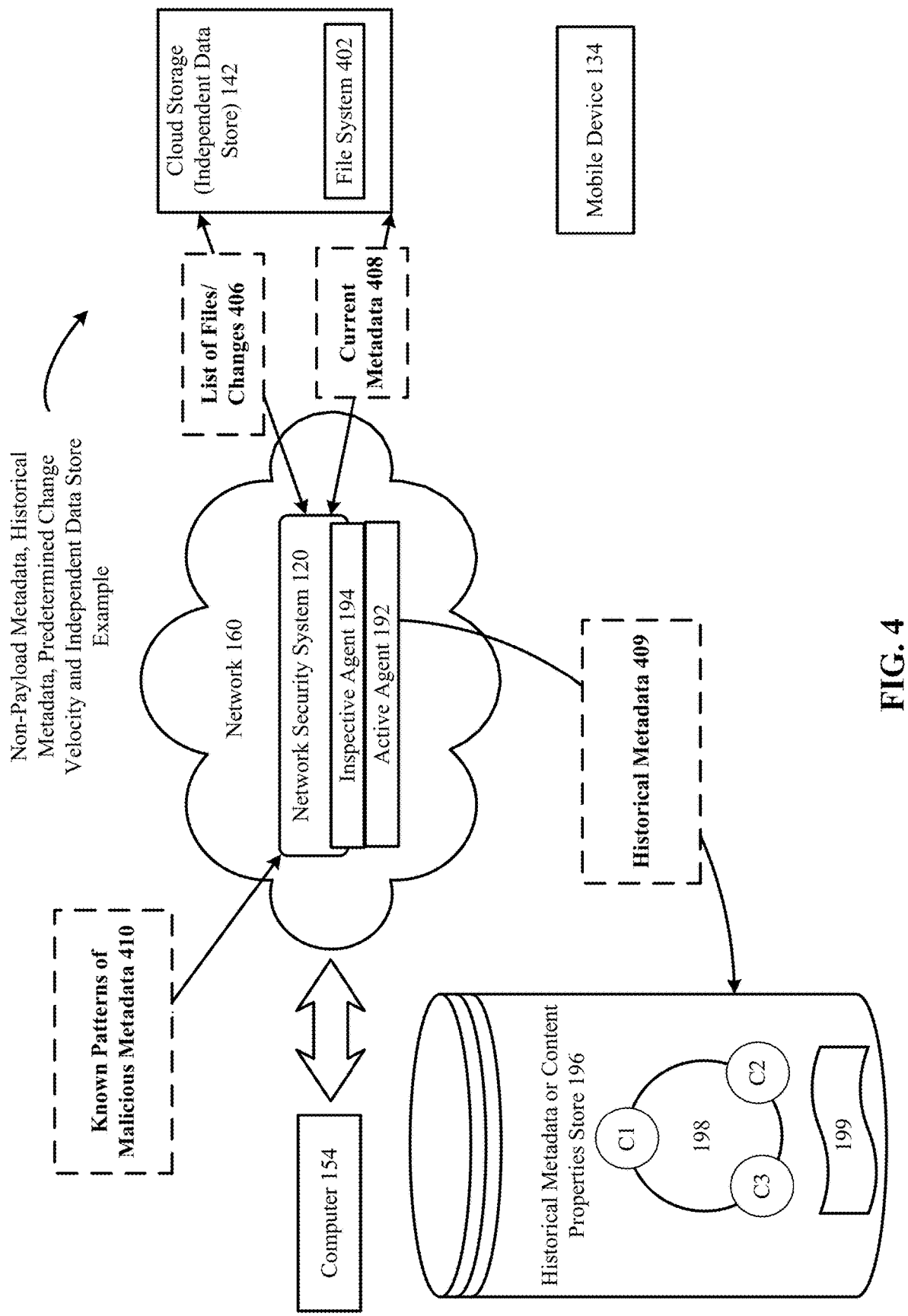
FIG. 4 illustrates one implementation of an inspective agent and/or an active agent detecting malicious activity using non-payload metadata, historical metadata, a predetermined change velocity, and an independent data store.

Non-Payload Metadata, Historical Metadata, Predetermined Change Velocity and Independent Data Store Example FIG. 4 depicts one implementation of a network security system 120 detecting and responding to a data attack (e.g., malicious activity) on a file system 402 (including files) stored on a cloud storage (i.e., independent data store) 142 by performing analysis of files stored on the independent data store 142. As discussed supra, an inspective agent 194 of the network security system 120 inspects content that resides in the cloud storage 142 after the content has been uploaded/updated on the cloud storage 142; and an active agent 192 detects malicious activity during a transfer of data to the independent data store 142 via a network 160, using historical metadata and/or historical content properties stored on a historical metadata or content properties store 196. One of the advantages of the inspective agent 194 is that malicious activity can detected by analyzing files updated and/or transferred to the cloud storage 142 outside of the network 160.

Specifically, according to the example of FIG. 4, the inspective agent 194 or the active agent 192 detects malicious activity using historical metadata 409 stored on a historical metadata or content properties store 196. In this example, a list 406 is scanned by the network security system 120 and/or the computer 154 to identify files in a file system 402 of the cloud storage 142 that have been updated within a determined timeframe. The inspective agent 194 or the active agent 192 of the network security system 120 and/or the computer 154 assembles current metadata 408 for the respective files identified by the scanning of the list 406, wherein the current metadata 408 can be assembled from file system lists for and file headers of the respective files.

The inspective agent 194, the active agent 192 and/or the computer 154 also accesses the historical metadata or properties store 196, which stores historical metadata, to obtain historical metadata 409 of each of the files (of the file system 402) identified on the list 406. The historical metadata 409 is maintained independently from and not under control of the file system 402, wherein the historical metadata or content properties store 196 preserves generations of metadata describing files in the file system 402 such that prior generation metadata remains available after a file and file metadata have been updated in the file system 402. Some of the historical metadata 409 of the files can be information previously collected by the active agent 192 and/or collected by the active agent 192 running concurrently with the inspective agent 194. In other words, metadata can be shared between the active agent 192 and the inspective agent 194.

The inspective agent 194 or the active agent 192 also determines that the malicious activity in in process by analyzing the current metadata 408 of the respective files and the historical metadata 409 of the respective files to identify a pattern of changes from the historical metadata 409 to the current metadata 408 of the respective files the exceeds a predetermined change velocity. Examples of various ways of determining whether the predetermined change velocity has been exceeded are described below.

The inspective agent 194 or the active agent 192 further determines that the malicious activity in in process by analyzing the current metadata 408 of the respective files and known patterns of malicious metadata 410 that indicate a known malicious file modification to identify a match between the current metadata 408 of the respective files and the known patterns of malicious metadata 410 that indicate the known malicious file modification. Examples of known patterns of malicious metadata 410 are described below.

Once a determination is made that the malicious activity is in process, the network security system 120 determines the machine (e.g., the computer 154 or a mobile device 134) and/or user that initiated the malicious activity. Additionally, after determining the machine and/or user that initiated the malicious activity, the inspective agent 194 or the active agent 192 can invoke or facilitate an implementation of a response mechanism that restricts file modifications by the determined machine and/or user. Examples of response mechanisms are described in further detail below.

Figure 5:
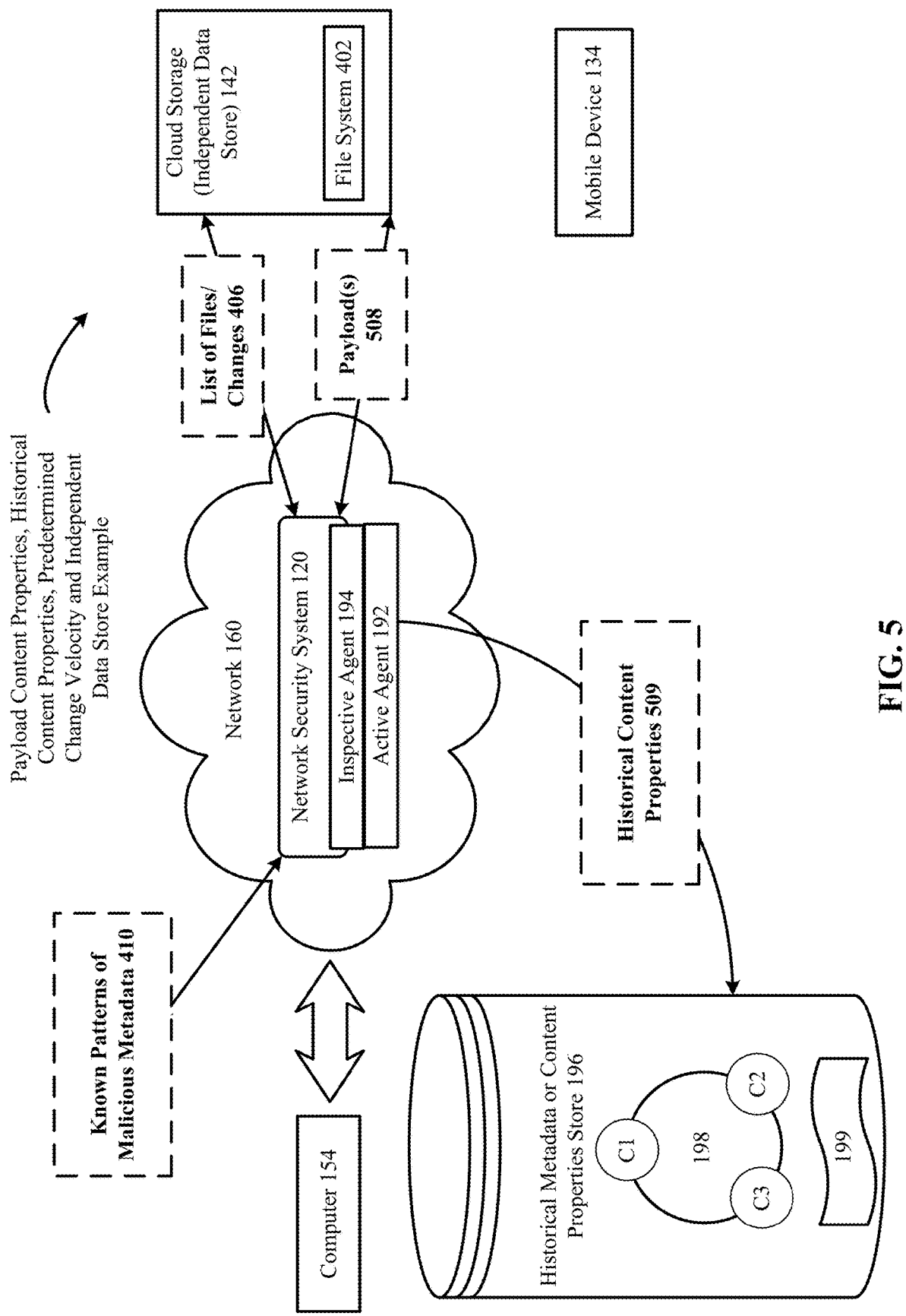
FIG. 5 illustrates one implementation of an inspective agent and/or an active agent detecting malicious activity using payload content properties, historical content properties, a predetermined change velocity and an independent data store.

Payload Content Properties, Historical Content Properties, Predetermined Change Velocity and Independent Data Store Example FIG. 5 depicts one implementation of a network security system 120 detecting and responding to a data attack (e.g., malicious activity) on a file system 402 (including files) stored on a cloud storage (i.e., independent data store) 142 by performing analysis of files stored on the independent data store 142. As discussed supra, an inspective agent 194 of the network security system 120 inspects content that resides in the cloud storage 142 after the content has been uploaded/updated on the cloud storage 142; and an active agent 192 detects malicious activity during a transfer of data to the independent data store 142 via a network 160, using historical metadata and/or historical content properties stored on a historical metadata or content properties store 196. One of the advantages of the inspective agent 194 is that malicious activity can detected by analyzing files updated and/or transferred to the cloud storage 142 outside of the network 160.

Specifically, according to the example of FIG. 5, the inspective agent 194 or the active agent 192 detects malicious activity using historical content properties 509 stored on a historical metadata or content properties store 196. In this example, a list 406 is scanned by the network security system 120 and/or the computer 154 to identify files in a file system 402 of the cloud storage 142 that have been updated within a determined timeframe. The inspective agent 194 or the active agent 192 of the network security system 120 and/or the computer 154 reads a payload 508 of the respective files identified by the scanning of the list 406 and calculates current content properties for the respective files from the read payload 508 of the respective files.

The inspective agent 194, the active agent 192 and/or the computer 154 also accesses the historical metadata or content properties store 196, which stores historical content properties, to obtain historical content properties 509 based on the read payload 508 of each of the files (of the file system 402) identified on the list 406. The historical content properties 509 is maintained independently from and not under control of the file system 402, wherein the historical metadata or content properties store 196 preserves generations of content properties describing files in the file system 402 such that prior generation content properties remains available after a file and file content properties have been updated in the file system 402. Some of the historical content properties 509 of the files can be information previously collected by the active agent 192 and/or collected by the active agent 192 running concurrently with the inspective agent 194. In other words, content properties can be shared between the active agent 192 and the inspective agent 194.

The inspective agent 194 or the active agent 192 also determines that the malicious activity in in process by analyzing the current content properties calculated from the payload 508 of the respective files and the historical content properties 509 of the respective files to identify a pattern of changes between the current content properties and the historical content properties 509 that exceeds a predetermined change velocity. Examples of various ways of determining whether the predetermined change velocity has been exceeded are described below.

The inspective agent 194 or the active agent 192 further determines that the malicious activity in in process by analyzing the current content properties of the respective files and known patterns of malicious metadata 410 that indicate a known malicious file modification to identify a match between the current content properties of the respective files and the known patterns of malicious metadata 410 that indicate the known malicious file modification. Examples of known patterns of malicious metadata 410 are described below.

Once a determination is made that the malicious activity is in process, the network security system 120 determines the machine (e.g., the computer 154 or a mobile device 134) and/or user that initiated the malicious activity. Additionally, after determining the machine and/or user that initiated the malicious activity, the inspective agent 194 or the active agent 192 can invoke or facilitate an implementation of a response mechanism that restricts file modifications by the determined machine and/or user. Examples of response mechanisms are described in further detail below.

Figure 6:
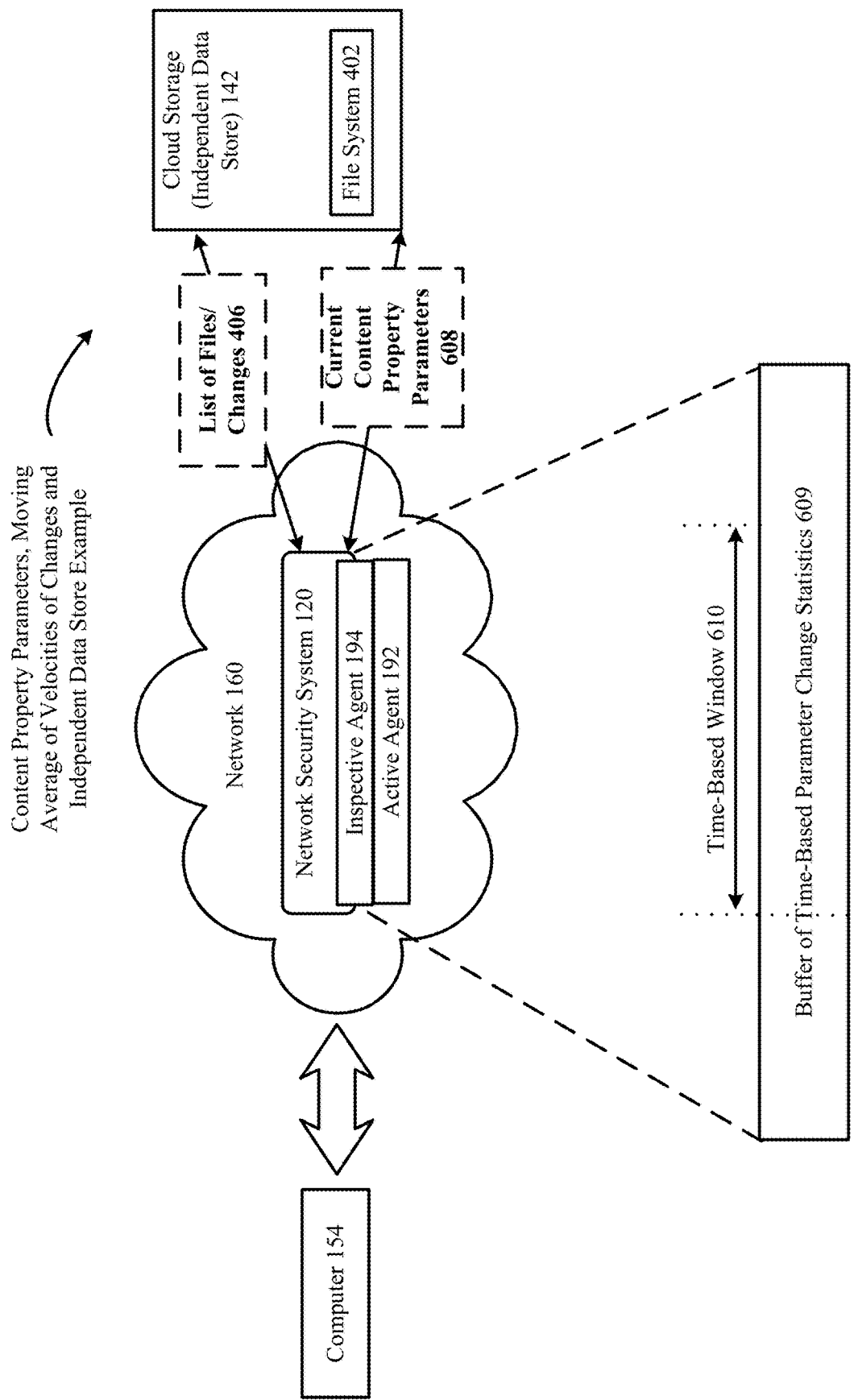
FIG. 6 illustrates one implementation of an inspective agent and/or an active agent detecting malicious activity using content property parameters, a moving average of velocities of change and an independent data store.

Content Property Parameters, Moving Average of Velocities of Change and Independent Data Store Example FIG. 6 depicts one implementation of a network security system 120 detecting and responding to a data attack (e.g., malicious activity) on a file system 402 (including files) stored on a cloud storage (i.e., independent data store) 142 by performing analysis of files stored on the independent data store 142. As discussed supra, an inspective agent 194 of the network security system 120 inspects content that resides in the cloud storage 142 after the content has been uploaded/updated on the cloud storage 142; and an active agent 192 detects malicious activity during a transfer of data to the independent data store 142 via a network 160. One of the advantages of the inspective agent 194 is that malicious activity can detected by analyzing files updated and/or transferred to the cloud storage 142 outside of the network 160.

Specifically, according to the example of FIG. 6, the inspective agent 194 or the active agent 192 detects malicious activity using current content property parameters 608. In this example, a list 406 is scanned by the network security system 120 and/or the computer 154 to identify files in a file system 402 of the cloud storage 142 that have been updated within a determined timeframe. The inspective agent 194 or the active agent 192 of the network security system 120 and/or the computer 154 assembles the current content property parameters 608 for each respective file of the respective files identified by the scanning of the list 406.

The inspective agent 194 or the active agent 192 also repeatedly calculated a moving average of velocities of change for the current content property parameters 608 of the identified files. The moving average of velocities of change is calculated by (i) for each respective parameter of the current content property parameters, maintaining a buffer of time-based parameter change statistics 609, and (ii) in a moving time-based window 610 applied to the buffer 609, calculating the moving average of velocity of change for the respective parameter. A more detailed example of the moving average of velocities of change is provided below after FIG. 6 is described in its entirety.

The inspective agent 194 or the active agent 192 also determines that the malicious activity in in process by identifying when there is a statistically significant acceleration in the calculated moving average of velocities of change for the current content property parameters 608.

Once a determination is made that the malicious activity is in process, the network security system 120 determines the machine (e.g., the computer 154 or a mobile device 134) and/or user that initiated the malicious activity. Additionally, after determining the machine and/or user that initiated the malicious activity, the inspective agent 194 or the active agent 192 can invoke or facilitate an implementation of a response mechanism that restricts file modifications by the determined machine and/or user. Examples of response mechanisms are described in further detail below.

A more detailed example of the moving average of velocities of change is provided, wherein, in an implementation, the active agent 192, the inspective agent 194 and/or the client agent (e.g., the computer 154 or software running thereon) (also referred to as "agents") may detect the malicious activity using a repeatedly calculated moving average of velocities of change for current content property parameters. Specifically, the agents can repeatedly scan a list to identify file sin the file system of the cloud storage 142 that have been updated within a determined timeframe and then assemble current content property parameters for each respective file of the files identified by the scanning. Further, the agents can calculate the moving average of velocities of change for the current content property parameters of the identified files by (i) for each respective parameter of the current content property parameters, maintaining a buffer of time-based parameter change statistics and (ii) in a moving time-based window applied to the buffer, calculating the moving average of velocity of change for the respective parameter.

The agents can then determine that the malicious activity is in process by identifying when there is a statistically significant acceleration in the calculated moving average of velocities of change for the current content property parameters. The statistically significant acceleration can be percentage based, raw data based or a weighted combination of percentage and raw data. Further, the statistically significant acceleration can evolve based on other factors and can be based on percentages of change where some types of metadata and/or content properties have a higher or lower weighted value as opposed to other types of metadata and/or content properties.

Further, the agents can determine that the malicious activity is in process by comparing the calculated moving average of velocities of change (within, for example, the time-based window) to n-standard deviations of the moving average of velocities of change. The n-standard deviations can be calculated from the same time-based window as the moving average of velocities of change or they can be calculated from a longer or shorter time-based window, such that the time-based windows for determining the moving average of velocities of change and for determining the n-standard deviations are slightly or significantly different with respect to one another. For example, the time-based window for the moving average of velocity of change could be 10 days and the time-based window for calculating the n-standard deviations could be 1 day, or visa-versa. The n-standard deviations can be used to set upper and lower thresholds, so that a determination can be made that the malicious activity is in process when the thresholds are exceeded by, for example, the calculated moving average of velocities of change, or any other criteria described herein. These upper and lower thresholds can be calculated and implemented in a similar way as Bollinger bands, or any other variation thereof that would be clear to a person of skill in this field of endeavor. For example M-tops and W-bottoms can be derived from the Bollinger bands and can be implemented for identifying malicious activity.

The agents can determine a machine and/or user that initiated the malicious activity and responsive to the determination of the machine and/or user that initiated the malicious activity, implement a response mechanism that restricts file modifications by the determined machine and/or user.

Figure 7:
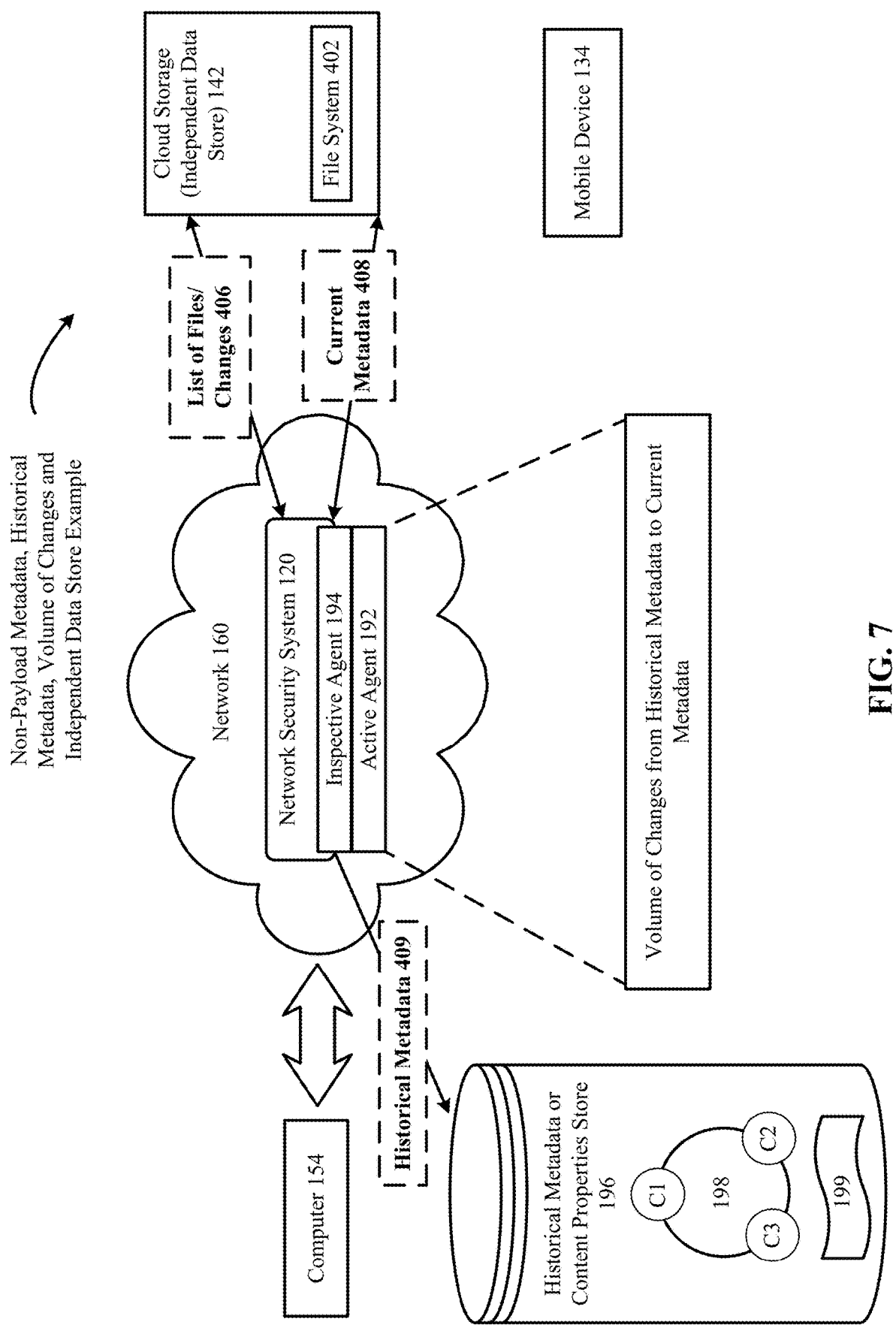
FIG. 7 illustrates one implementation of an inspective agent and/or an active agent detecting malicious activity using non-payload metadata, historical metadata, a volume of changes and an independent data store.

Non-Payload Metadata, Historical Metadata, Volume of Changes and Independent Data Store Example FIG. 7 depicts one implementation of a network security system 120 detecting and responding to a data attack (e.g., malicious activity) on a file system 402 (including files) stored on a cloud storage (i.e., independent data store) 142 by performing analysis of files stored on the independent data store 142. As discussed supra, an inspective agent 194 of the network security system 120 inspects content that resides in the cloud storage 142 after the content has been uploaded/updated on the cloud storage 142; and an active agent 192 detects malicious activity during a transfer of data to the independent data store 142 via a network 160, using historical metadata and/or historical content properties stored on a historical metadata or content properties store 196. One of the advantages of the inspective agent 194 is that malicious activity can detected by analyzing files updated and/or transferred to the cloud storage 142 outside of the network 160.

Specifically, according to the example of FIG. 7, the inspective agent 194 or the active agent 192 detects malicious activity using historical metadata 409 stored on a historical metadata or content properties store 196. In this example, a list 406 is scanned by the network security system 120 and/or the computer 154 to identify files in a file system 402 of the cloud storage 142 that have been updated within a determined timeframe. The inspective agent 194 or the active agent 192 of the network security system 120 and/or the computer 154 assembles current metadata 408 for the respective files identified by the scanning of the list 406, wherein the current metadata 408 can be assembled from file system lists for and file headers of the respective files.

The inspective agent 194, the active agent 192 and/or the computer 154 also accesses the historical metadata or properties store 196, which stores historical metadata, to obtain historical metadata 409 of each of the files (of the file system 402) identified on the list 406. The historical metadata 409 is maintained independently from and not under control of the file system 402, wherein the historical metadata or content properties store 196 preserves generations of metadata describing files in the file system 402 such that prior generation metadata remains available after a file and file metadata have been updated in the file system 402. Some of the historical metadata 409 of the files can be information previously collected by the active agent 192 and/or collected by the active agent 192 running concurrently with the inspective agent 194. In other words, metadata can be shared between the active agent 192 and the inspective agent 194.

The inspective agent 194 or the active agent 192 also determines that the malicious activity in in process by analyzing the current metadata 408 of the respective files and the historical metadata 409 of the respective files to identify a volume of changes from the historical metadata 409 to the current metadata 408 of the respective files that exceeds a predetermined change volume. As an alternative to the moving average of velocities described supra, the predetermined change volume can be identified to determine whether or not malicious activity is in process. The predetermined change volume can be based on, for example a number of files that have changes or a cumulative number of changes for each file (or each type of file or group of files), where some types of changes have a higher impact on the pattern/volume of changes than other types of changes.

The inspective agent 194 or the active agent 192 further determines that the malicious activity in in process by analyzing the current metadata 408 of the respective files and known patterns of malicious metadata 410 that indicate a known malicious file modification to identify a match between the current metadata 408 of the respective files and the known patterns of malicious metadata 410 that indicate the known malicious file modification. Examples of known patterns of malicious metadata 410 are described below.

Once a determination is made that the malicious activity is in process, the network security system 120 determines the machine (e.g., the computer 154 or a mobile device 134) and/or user that initiated the malicious activity. Additionally, after determining the machine and/or user that initiated the malicious activity, the inspective agent 194 or the active agent 192 can invoke or facilitate an implementation of a response mechanism that restricts file modifications by the determined machine and/or user. Examples of response mechanisms are described in further detail below.

Figure 8:
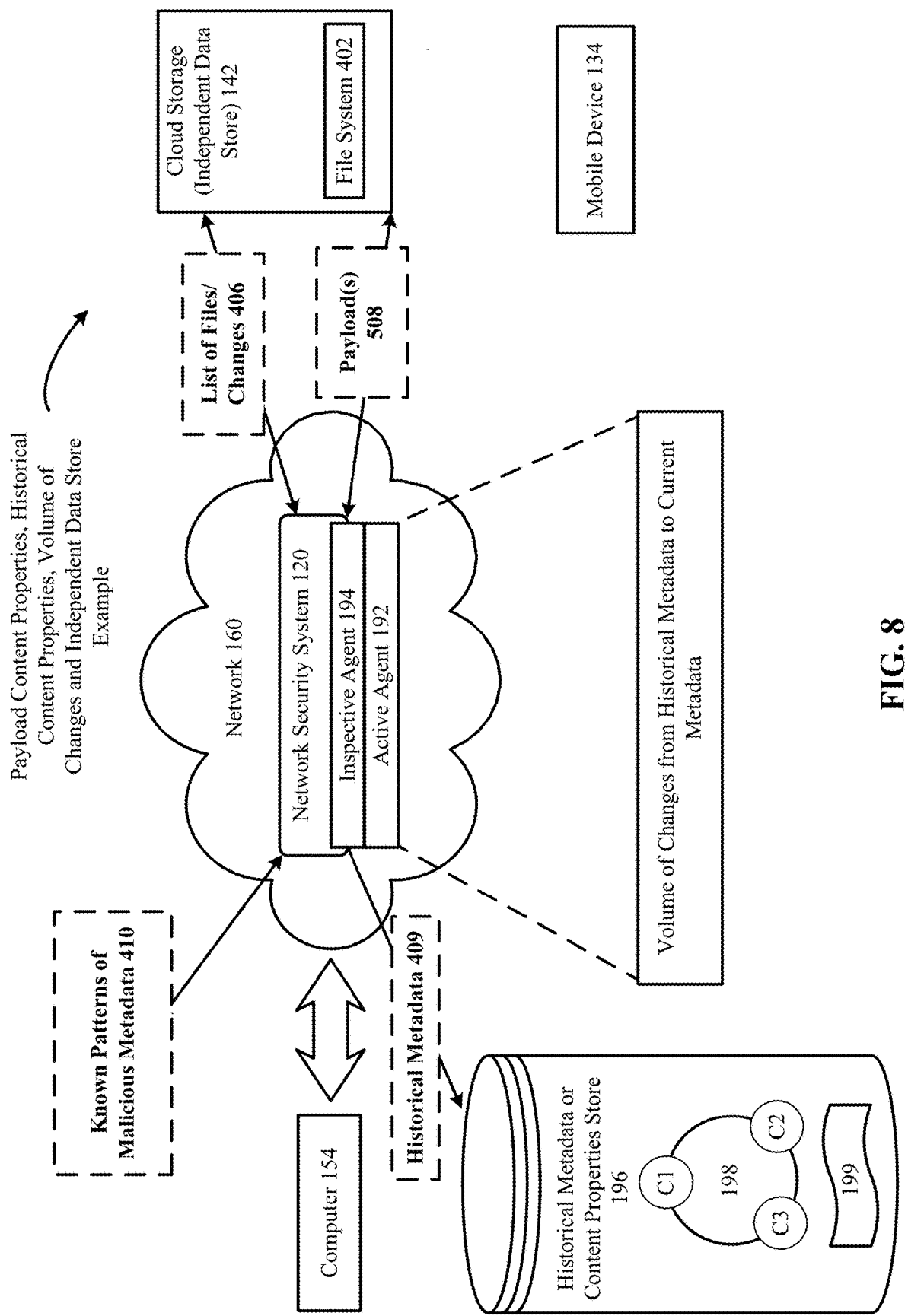
FIG. 8 illustrates one implementation of an inspective agent and/or an active agent detecting malicious activity using payload content properties, historical content properties, a volume of changes and an independent data store.

Payload Content Properties, Historical Content Properties, Volume of Changes and Independent Data Store Example FIG. 8 depicts one implementation of a network security system 120 detecting and responding to a data attack (e.g., malicious activity) on a file system 402 (including files) stored on a cloud storage (i.e., independent data store) 142 by performing analysis of files stored on the independent data store 142. As discussed supra, an inspective agent 194 of the network security system 120 inspects content that resides in the cloud storage 142 after the content has been uploaded/updated on the cloud storage 142; and an active agent 192 detects malicious activity during a transfer of data to the independent data store 142 via a network 160, using historical metadata and/or historical content properties stored on a historical metadata or content properties store 196. One of the advantages of the inspective agent 194 is that malicious activity can detected by analyzing files updated and/or transferred to the cloud storage 142 outside of the network 160.

Specifically, according to the example of FIG. 8, the inspective agent 194 or the active agent 192 detects malicious activity using historical content properties 509 stored on a historical metadata or content properties store 196. In this example, a list 406 is scanned by the network security system 120 and/or the computer 154 to identify files in a file system 402 of the cloud storage 142 that have been updated within a determined timeframe. The inspective agent 194 or the active agent 192 of the network security system 120 and/or the computer 154 reads a payload 508 of the respective files identified by the scanning of the list 406.

The inspective agent 194, the active agent 192 and/or the computer 154 also accesses the historical metadata or content properties store 196, which stores historical content properties, to obtain historical content properties 509 based on the read payload 508 of each of the files (of the file system 402) identified on the list 406. The historical content properties 509 is maintained independently from and not under control of the file system 402, wherein the historical metadata or content properties store 196 preserves generations of content properties describing files in the file system 402 such that prior generation content properties remains available after a file and file content properties have been updated in the file system 402. Some of the historical content properties 509 of the files can be information previously collected by the active agent 192 and/or collected by the active agent 192 running concurrently with the inspective agent 194. In other words, content properties can be shared between the active agent 192 and the inspective agent 194.

The inspective agent 194 or the active agent 192 also determines that the malicious activity in in process by analyzing the current content properties calculated from the payload 508 of the respective files and the historical content properties 509 of the respective files to identify a volume of changes between the current content properties and the historical content properties of the respective files that exceeds a predetermined change volume. As an alternative to the moving average of velocities described supra, the predetermined change volume can be identified to determine whether or not malicious activity is in process. The predetermined change volume can be based on, for example a number of files that have changes or a cumulative number of changes for each file (or each type of file or group of files), where some types of changes have a higher impact on the pattern/volume of changes than other types of changes.

The inspective agent 194 or the active agent 192 further determines that the malicious activity in in process by analyzing the current content properties of the respective files and known patterns of malicious metadata 410 that indicate a known malicious file modification to identify a match between the current content properties of the respective files and the known patterns of malicious metadata 410 that indicate the known malicious file modification. Examples of known patterns of malicious metadata 410 are described below.

Once a determination is made that the malicious activity is in process, the network security system 120 determines the machine (e.g., the computer 154 or a mobile device 134) and/or user that initiated the malicious activity. Additionally, after determining the machine and/or user that initiated the malicious activity, the inspective agent 194 or the active agent 192 can invoke or facilitate an implementation of a response mechanism that restricts file modifications by the determined machine and/or user. Examples of response mechanisms are described in further detail below.

Figure 9:
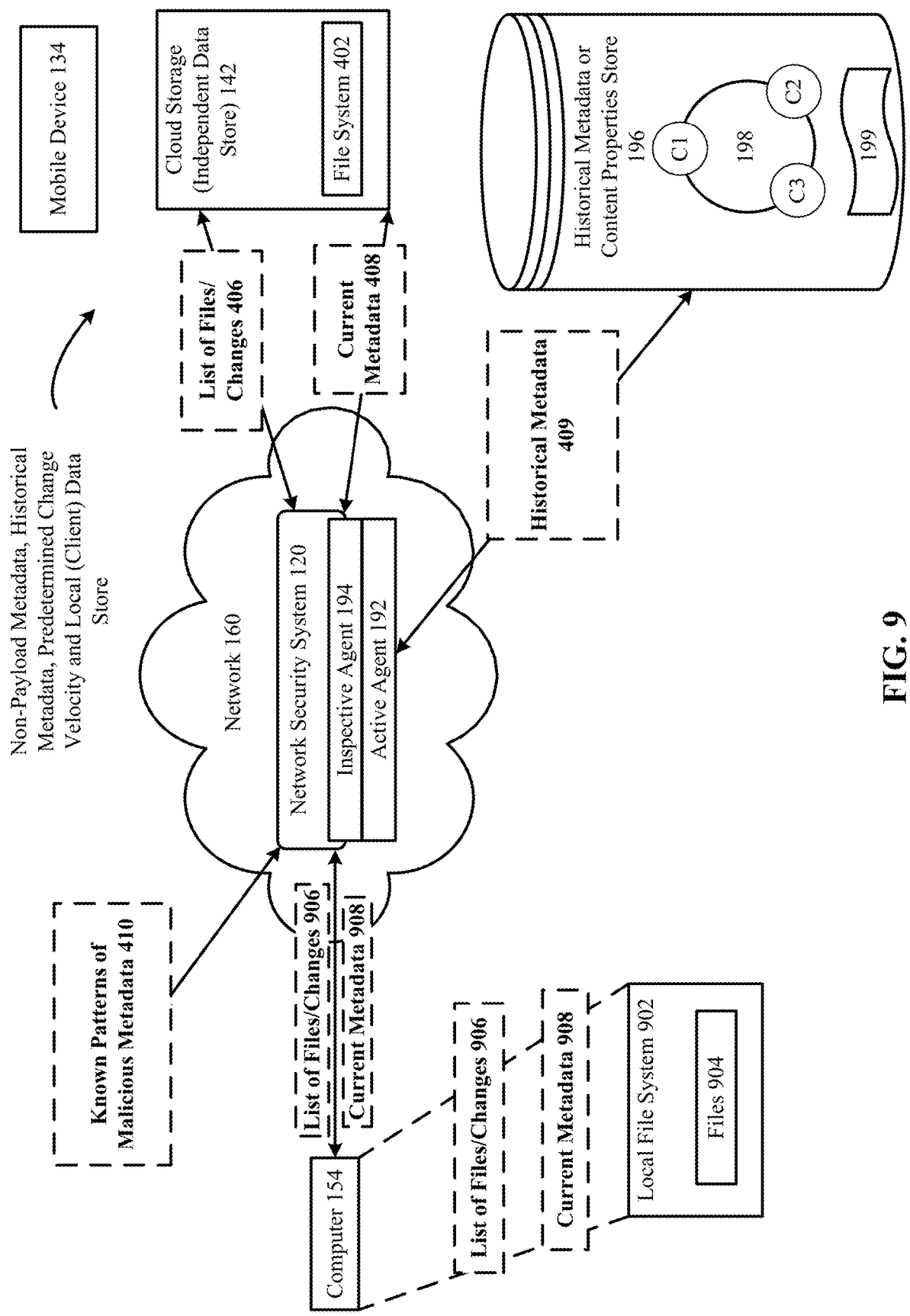
FIG. 9 illustrates one implementation of an inspective agent and/or an active agent detecting malicious activity using non-payload metadata, historical metadata, a predetermined change velocity and a local (client) data store.

Non-Payload Metadata, Historical Metadata, Predetermined Change Velocity and Local (Client) Example FIG. 9 depicts one implementation of a network security system 120 detecting and responding to a data attack (e.g., malicious activity) on a local file system 902 (including files 904) of a local device (e.g., computer 154) synchronized to a file system 402 of a cloud storage (i.e., independent data store) 142 by performing analysis of files stored on the independent data store 142. As discussed supra, an inspective agent 194 of the network security system 120 inspects content that resides in the cloud storage 142 after the content has been uploaded/updated on the cloud storage 142; and an active agent 192 detects malicious activity during a transfer of data to the independent data store 142 via a network 160, using historical metadata and/or historical content properties stored on a historical metadata or content properties store 196. One of the advantages of the inspective agent 194 is that malicious activity can detected by analyzing files updated and/or transferred to the cloud storage 142 outside of the network 160.

Specifically, according to the example of FIG. 9, the inspective agent 194 or the active agent 192 detects malicious activity using historical metadata 409 stored on a historical metadata or content properties store 196. In this example, a list 906 is scanned by the network security system 120 and/or the computer 154 to identify files in the file system 902 of the computer 154 that have been updated within a determined timeframe. The inspective agent 194 or the active agent 192 of the network security system 120 and/or the computer 154 assembles current metadata 908 for the respective files identified by the scanning of the list 906, wherein the current metadata 908 can be assembled from file system lists for and file headers of the respective files.

The inspective agent 194, the active agent 192 and/or the computer 154 also accesses the historical metadata or properties store 196, which stores historical metadata, to obtain historical metadata 409 of each of the files (of the file system 402) identified on the list 406. The historical metadata 409 is maintained independently from and not under control of the file system 402, wherein the historical metadata or content properties store 196 preserves generations of metadata describing files in the file system 402 such that prior generation metadata remains available after a file and file metadata have been updated in the file system 402. Some of the historical metadata 409 of the files can be information previously collected by the active agent 192 and/or collected by the active agent 192 running concurrently with the inspective agent 194. In other words, metadata can be shared between the active agent 192 and the inspective agent 194.

The inspective agent 194 or the active agent 192 also determines that the malicious activity in in process by analyzing the current metadata 908 of the respective files and the historical metadata 409 of the respective files to identify a pattern of changes from the historical metadata 409 to the current metadata 908 of the respective files the exceeds a predetermined change velocity. Examples of various ways of determining whether the predetermined change velocity has been exceeded are described below.

The inspective agent 194 or the active agent 192 further determines that the malicious activity in in process by analyzing the current metadata 408 of the respective files and known patterns of malicious metadata 410 that indicate a known malicious file modification to identify a match between the current metadata 908 of the respective files and the known patterns of malicious metadata 410 that indicate the known malicious file modification. Examples of known patterns of malicious metadata 410 are described below.

Once a determination is made that the malicious activity is in process, the network security system 120 determines the machine (e.g., the computer 154 or a mobile device 134) and/or user that initiated the malicious activity. Additionally, after determining the machine and/or user that initiated the malicious activity, the inspective agent 194 or the active agent 192 can invoke or facilitate an implementation of a response mechanism that restricts file modifications by the determined machine and/or user. Examples of response mechanisms are described in further detail below.

Figure 10:
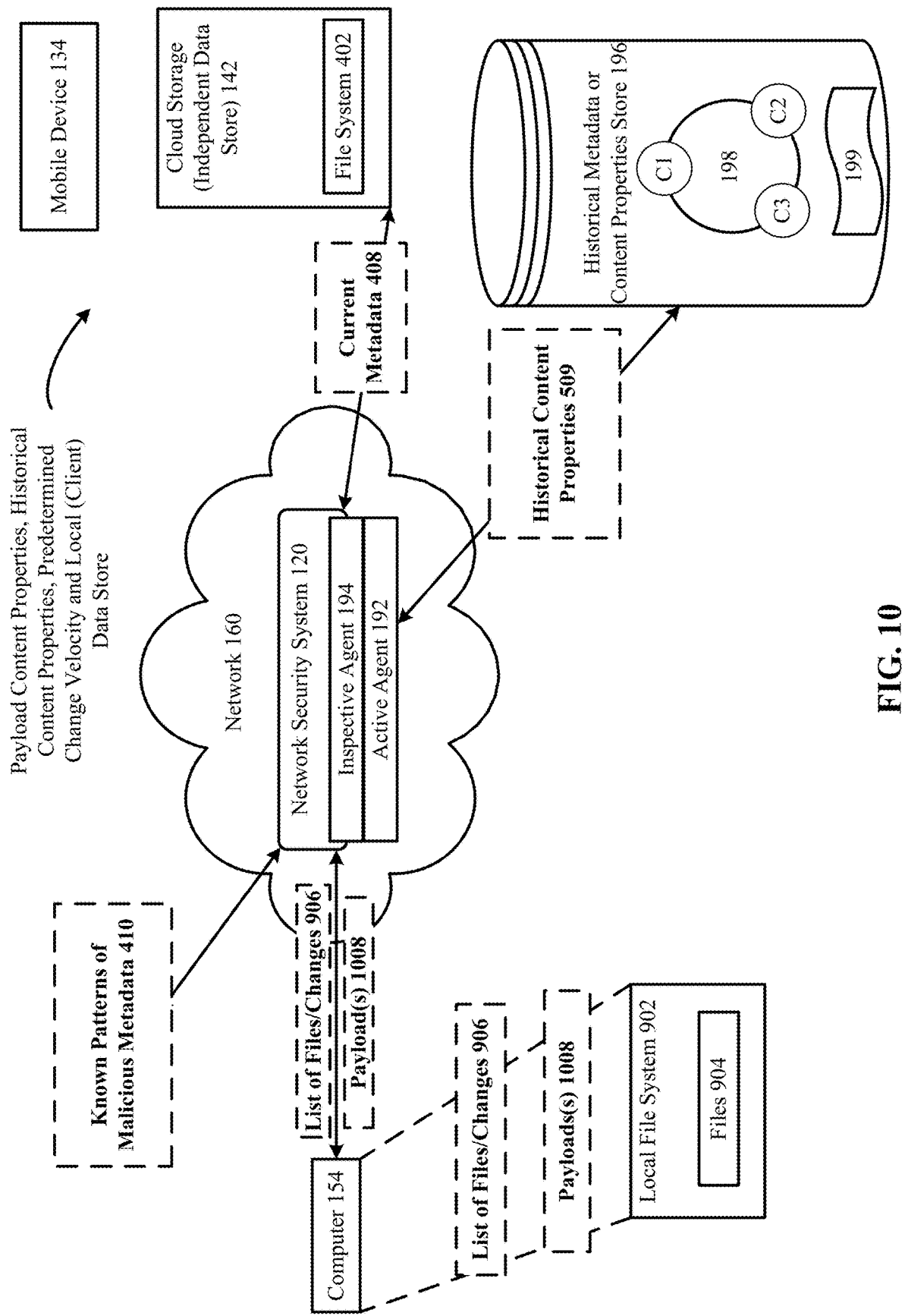
FIG. 10 illustrates one implementation of an inspective agent and/or an active agent detecting malicious activity using payload content properties, historical content properties, a predetermined change velocity and a local (client) data store.

Payload Content Properties, Historical Content Properties, Predetermined Change Velocity and Local (Client) Data Store Example FIG. 10 depicts one implementation of a network security system 120 detecting and responding to a data attack (e.g., malicious activity) on a local file system 902 (including files 904) of a local device (e.g., computer 154) synchronized to a file system 402 of a cloud storage (i.e., independent data store) 142 by performing analysis of files stored on the independent data store 142. As discussed supra, an inspective agent 194 of the network security system 120 inspects content that resides in the cloud storage 142 after the content has been uploaded/updated on the cloud storage 142; and an active agent 192 detects malicious activity during a transfer of data to the independent data store 142 via a network 160, using historical metadata and/or historical content properties stored on a historical metadata or content properties store 196. One of the advantages of the inspective agent 194 is that malicious activity can detected by analyzing files updated and/or transferred to the cloud storage 142 outside of the network 160

Specifically, according to the example of FIG. 8, the inspective agent 194 or the active agent 192 detects malicious activity using historical content properties 509 stored on a historical metadata or content properties store 196. In this example, a list 906 is scanned by the network security system 120 and/or the computer 154 to identify files in the local file system 902 that have been updated within a determined timeframe. The inspective agent 194 or the active agent 192 of the network security system 120 and/or the computer 154 reads a payload 1008 of the respective files identified by the scanning of the list 906 and calculates current content properties for the respective files from the payload 1008 of the respective files.

The inspective agent 194, the active agent 192 and/or the computer 154 also accesses the historical metadata or content properties store 196, which stores historical content properties, to obtain historical content properties 509 based on the read payload 1008 of each of the files (of the file system 902) identified on the list 906. The historical content properties 509 is maintained independently from and not under control of the file system 402, wherein the historical metadata or content properties store 196 preserves generations of content properties describing files in the file system 402 such that prior generation content properties remains available after a file and file content properties have been updated in the file system 402. Some of the historical content properties 509 of the files can be information previously collected by the active agent 192 and/or collected by the active agent 192 running concurrently with the inspective agent 194. In other words, content properties can be shared between the active agent 192 and the inspective agent 194.

The inspective agent 194 or the active agent 192 also determines that the malicious activity in in process by analyzing the current content properties calculated from the payload 1008 of the respective files and the historical content properties 509 of the respective files to identify a pattern of changes between the current content properties and the historical content properties 509 that exceeds a predetermined change velocity. Examples of various ways of determining whether the predetermined change velocity has been exceeded are described below.

The inspective agent 194 or the active agent 192 further determines that the malicious activity in in process by analyzing the current content properties of the respective files and known patterns of malicious metadata 410 that indicate a known malicious file modification to identify a match between the current content properties of the respective files and the known patterns of malicious metadata 410 that indicate the known malicious file modification. Examples of known patterns of malicious metadata 410 are described below.

Once a determination is made that the malicious activity is in process, the network security system 120 determines the machine (e.g., the computer 154 or a mobile device 134) and/or user that initiated the malicious activity. Additionally, after determining the machine and/or user that initiated the malicious activity, the inspective agent 194 or the active agent 192 can invoke or facilitate an implementation of a response mechanism that restricts file modifications by the determined machine and/or user. Examples of response mechanisms are described in further detail below.

Figure 11:
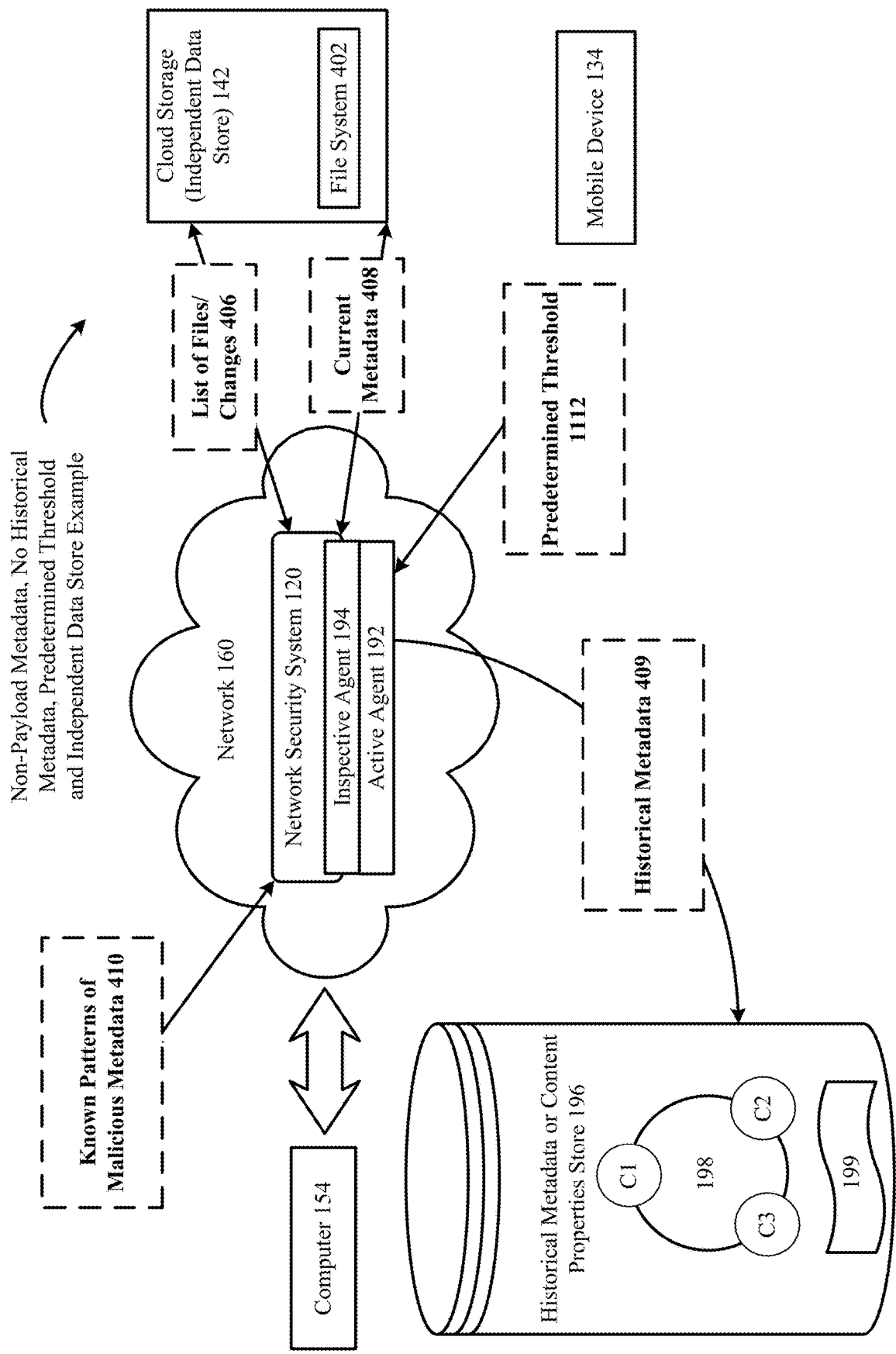
FIG. 11 illustrates one implementation of an inspective agent and/or an active agent detecting malicious activity using non-payload metadata, an identification of no historical content properties, a predetermined threshold and an independent data store.

Non-Payload Metadata, No Historical Metadata, Predetermined Threshold and Independent Data Store Example FIG. 11 depicts one implementation of a network security system 120 detecting and responding to a data attack (e.g., malicious activity) on a file system 402 (including files) stored on a cloud storage (i.e., independent data store) 142 by performing analysis of files stored on the independent data store 142. As discussed supra, an inspective agent 194 of the network security system 120 inspects content that resides in the cloud storage 142 after the content has been uploaded/updated on the cloud storage 142; and an active agent 192 detects malicious activity during a transfer of data to the independent data store 142 via a network 160. One of the advantages of the inspective agent 194 is that malicious activity can detected by analyzing files updated and/or transferred to the cloud storage 142 outside of the network 160.

Specifically, according to the example of FIG. 11 a list 406 is scanned by the network security system 120 and/or the computer 154 to identify files in a file system 402 of the cloud storage 142 that have been updated within a determined timeframe. The inspective agent 194 or the active agent 192 of the network security system 120 and/or the computer 154 assembles current metadata 408 for the respective files identified by the scanning of the list 406, wherein the current metadata 408 can be assembled from file system lists for and file headers of the respective files.

The inspective agent 194, the active agent 192 and/or the computer 154 also accesses the historical metadata or properties store 196, which stores historical metadata, to obtain historical metadata 409 of each of the files (of the file system 402) identified on the list 406. The historical metadata 409 is maintained independently from and not under control of the file system 402, wherein the historical metadata or content properties store 196 preserves generations of metadata describing files in the file system 402 such that prior generation metadata remains available after a file and file metadata have been updated in the file system 402. Some of the historical metadata 409 of the files can be information previously collected by the active agent 192 and/or collected by the active agent 192 running concurrently with the inspective agent 194. In other words, metadata can be shared between the active agent 192 and the inspective agent 194.

The inspective agent 194 or the active agent 192 also determines that the malicious activity in in process (i) when the historical metadata 409 does not exist for the respective files and (ii) when a pattern of the current metadata 408 of the respective files exceeds a predetermined threshold 1112. Examples of various ways of the pattern of the current metadata 408 exceeding the predetermined threshold 1112 are described supra. Other thresholds can be set based on any of the criteria described in this document and additional thresholds will be clear to a person of ordinary skill in the art.

The inspective agent 194 or the active agent 192 further determines that the malicious activity in in process by analyzing the current metadata 408 of the respective files and known patterns of malicious metadata 410 that indicate a known malicious file modification to identify a match between the current metadata 408 of the respective files and the known patterns of malicious metadata 410 that indicate the known malicious file modification. Examples of known patterns of malicious metadata 410 are described below.

Once a determination is made that the malicious activity is in process, the network security system 120 determines the machine (e.g., the computer 154 or a mobile device 134) and/or user that initiated the malicious activity. Additionally, after determining the machine and/or user that initiated the malicious activity, the inspective agent 194 or the active agent 192 can invoke or facilitate an implementation of a response mechanism that restricts file modifications by the determined machine and/or user. Examples of response mechanisms are described in further detail below.

Figure 12:
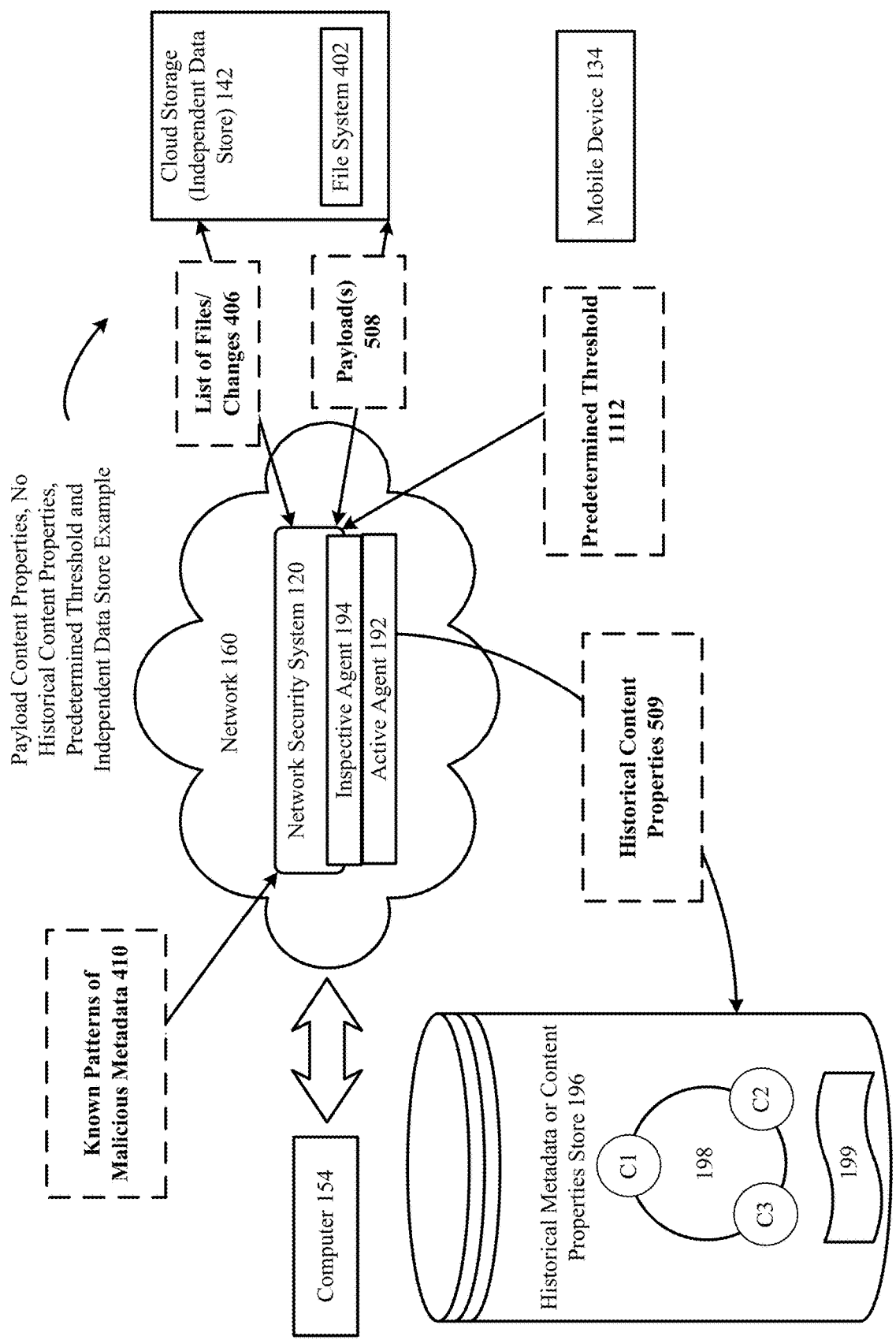
FIG. 12 illustrates one implementation of an inspective agent and/or an active agent detecting malicious activity using payload content properties, an identification of no historical content properties, a predetermined threshold and an independent data store.

Payload Content Properties, No Historical Content Properties, Predetermined Threshold and Independent Data Store Example FIG. 12 depicts one implementation of a network security system 120 detecting and responding to a data attack (e.g., malicious activity) on a file system 402 (including files) stored on a cloud storage (i.e., independent data store) 142 by performing analysis of files stored on the independent data store 142. As discussed supra, an inspective agent 194 of the network security system 120 inspects content that resides in the cloud storage 142 after the content has been uploaded/updated on the cloud storage 142; and an active agent 192 detects malicious activity during a transfer of data to the independent data store 142 via a network 160, using historical metadata and/or historical content properties stored on a historical metadata or content properties store 196. One of the advantages of the inspective agent 194 is that malicious activity can detected by analyzing files updated and/or transferred to the cloud storage 142 outside of the network 160.

Specifically, according to the example of FIG. 10, the inspective agent 194 or the active agent 192 detects malicious activity using historical content properties 509 stored on a historical metadata or content properties store 196. In this example, a list 406 is scanned by the network security system 120 and/or the computer 154 to identify files in a file system 402 of the cloud storage 142 that have been updated within a determined timeframe. The inspective agent 194 or the active agent 192 of the network security system 120 and/or the computer 154 reads a payload 508 of the respective files identified by the scanning of the list 406 and calculates current content properties for the respective files from the read payload 508 of the respective files.

The inspective agent 194, the active agent 192 and/or the computer 154 also accesses the historical metadata or content properties store 196, which stores historical content properties, to obtain historical content properties 509 based on the read payload 508 of each of the files (of the file system 402) identified on the list 406. The historical content properties 509 is maintained independently from and not under control of the file system 402, wherein the historical metadata or content properties store 196 preserves generations of content properties describing files in the file system 402 such that prior generation content properties remains available after a file and file content properties have been updated in the file system 402. Some of the historical content properties 509 of the files can be information previously collected by the active agent 192 and/or collected by the active agent 192 running concurrently with the inspective agent 194. In other words, content properties can be shared between the active agent 192 and the inspective agent 194.

The inspective agent 194 or the active agent 192 also determines that the malicious activity in in process (i) when the historical metadata 409 does not exist for the respective files and (ii) when a pattern of the current metadata of the respective files exceeds a predetermined threshold 1112. Examples of various ways of the pattern of the current metadata 408 exceeding the predetermined threshold 1112 are described supra. Other thresholds can be set based on any of the criteria described in this document and additional thresholds will be clear to a person of ordinary skill in the art.

The inspective agent 194 or the active agent 192 further determines that the malicious activity in in process by analyzing the current content properties of the respective files and known patterns of malicious metadata 410 that indicate a known malicious file modification to identify a match between the current content properties of the respective files and the known patterns of malicious metadata 410 that indicate the known malicious file modification. Examples of known patterns of malicious metadata 410 are described below.

Once a determination is made that the malicious activity is in process, the network security system 120 determines the machine (e.g., the computer 154 or a mobile device 134) and/or user that initiated the malicious activity. Additionally, after determining the machine and/or user that initiated the malicious activity, the inspective agent 194 or the active agent 192 can invoke or facilitate an implementation of a response mechanism that restricts file modifications by the determined machine and/or user. Examples of response mechanisms are described in further detail below.

Feature List

An implementation of the technology disclosed includes detecting and recovering from unauthorized encryption of a file/object stored on a cloud drive (independent data store) or on a local drive. This can be done using inspective analyzing (an inspective agent), active analyzing (an active agent) and client analyzing (a client agent), or any combination thereof. Inspective analyzing analyzes the files after they have been transferred to the cloud drive. Active analyzing analyzes files while (i.e., inline) they are being transferred to the cloud drive. Client analyzing analyzes files that are on a client's device before they are transferred to the cloud drive. The technology disclosed can classify an "attack" as being related to a specific actor (i.e., we want to determine who initiated or who is responsible for the attack).

Inspection

The detection/inspection of the files can take place at different locations and/or be performed using different methodologies. For example, inspective analyzing includes analyzing the files after they have been saved and/or updated on the cloud drive. This is performed by analyzing the files themselves and/or by analyzing stored metadata. The metadata could be stored locally or stored in the cloud. If an attack is detected, the independent data store can be isolated to prevent further spread.

In addition to inspective analyzing, inline active analyzing can be performed, which is analyzing while the file is being transferred to the cloud). This would include analyzing files while they are being saved to the cloud drive. This is performed by analyzing the files themselves or by analyzing stored metadata. The metadata could be stored locally or stored in the cloud. This would block the spread of the ransomware.

In addition to inline active analyzing, endpoint active analyzing can be performed. This would include analyzing files before they are transferred from user/client to the cloud drive. This is performed by analyzing the files themselves or by analyzing stored metadata. The metadata could be stored locally or stored in the cloud. This would block the spread of the ransomware.

Recovery

After an attack is identified, several different actions can be implemented in various different orders and/or combinations. In an implementation, the system may revert/restore previous versions of the attacked files. This can be done by restoring from a backup. It is important to verify that the file that is being restored from the backup has not been subject to attack.

In an implementation, the system may alert user or users of the drive (local and cloud drive) that there has been an attack. It is important to make sure to alert all users of the shared cloud drive, because cloud drives can be shared between many individuals and organizations. In an implementation, the system may prevent users from saving files to the cloud drive. This could include "disconnecting" anyone from the drive. This will prevent the user from saving any more potentially infected files and will prevent potentially infected files from being transferred from the cloud drive to the user's local drive.

In an implementation, the system may force a backup of the portions of or then entire drive. The system will backup files that have not yet been backed up. In an implementation, the system may broaden the initial scan. For example, the system can force each user (endpoint) to perform a local scan of their files. This can extend to all shared users of a cloud drive. If a threat is found on local drive, a scan of a cloud drive can be performed. The scan can be extended to other cloud drives to which the user is sharing or using (e.g., one person might use 10 different cloud drives, if a local threat is found or if a threat is found on one cloud drive, then the scan should extend to other cloud drives).

In an implementation, the system may isolate the user/endpoint. The user/endpoint can be isolated to prevent unintended or intentional saving of infected files. This can help preserve the integrity of the local drive as well as the integrity of the cloud drives. In an implementation, the system may classify the attack. This can be done by determining, based on the results of the inspection, the source (who did it) of the attack. This can be achieved using a lookup table and by comparing extracted information from the files to determine that an attack took place and who made the attack. In an implementation, the system may compare any identified encrypted files with known encryption methods, such as Bitlocker, filevault and boxcrypter etc. This could potentially be done using entropy or other methods. If this leads to conclusion that the user is just intentionally encrypting files, then an alert should be sent to the user just to let them know that encryption was detected.

In another implementation, if the active agent identifies an attack, than any modifications to files can be blocked and further action can take place to determine whether the attack is real. This approach can prevent any harm from an attack because the active agent can identify the attack before harm is caused. If the inspective agent identifies the attack, it is likely too late to prevent the harm from occurring. As such, a restore from a backup would most likely be an appropriate way to recover from such an attack.

Different Methodologies for Detecting an Attack.

An implementation of detecting the attack can be based on a pattern of changes in metadata related to headers of files. This can be done by comparing current metadata of recently updated/modified files with historical metadata. The change of current metadata for a single file, when compared to the historical metadata should not trigger the detection of an attack. However, when there is a pattern of changes between the current metadata and the historical metadata of several files that exceeds a predetermined change velocity, then it is likely that an attack has occurred. Additionally, the metadata related to the headers of the files can be compared to known patterns of malicious metadata that indicate a known malicious file modification. If there is a match, just for a single file, between the current metadata and the known patterns of malicious metadata, then a determination should be made that an attack has occurred.

Another implementation of detecting an attack can be based on a pattern of changes is current content properties related to the payload of files that have been recently updated/modified. The current content properties of the files can be compared to historical content properties of the files. Again, a change of current content properties for a single file, when compared to the historical content properties should not trigger a detection of an attack. However, when there is a pattern of changes between the current content properties and the historical content properties of several files that exceeds a predetermined change velocity, then it is likely that an attack has occurred. Additionally, the content properties related to the payload of the files can be compared to known patterns of malicious metadata that indicate a known malicious file modification. If there is a match, just for a single file, between the current content properties and the known patterns of malicious metadata, then a determination should be made that an attack has occurred.

A further implementation of detecting an attack can be based on a repeatedly calculation of a moving average of velocities of change for the current content property parameters of recently updated/modified files. If there is a statistically significant acceleration in the calculated moving average of velocities of change for the current content property parameters of the files, then at attack should be detected.

Parameters and Characteristics Used to Detect Malicious Activity

Considering that it could take significant time to encrypt all files of an independent data store, the system may consider whether a certain N number of files have been given the same new feature within M minutes. This could be done by looking at the files themselves or by looking at current/historical header-based metadata and/or payload-based content properties. The "same new feature" could be any type of information that could be gathered from the file. This could include size, extension, name, time/date, file type, properties (read only to read/write) etc. Frequency in changing files is also a consideration. Is there a large number of standalone files that have been modified in any way (especially expanded size or file name or increased entropy) within a certain timeframe? Repeated characteristics are also a consideration. Has there been a propagation of a file name part or a file size or similar to many new files?

Entropy of Contents of a file or files can be a consideration. A certain level of entropy can indicate encryption and/or compression. For example, MIME files are generally in the 0.73-0.75 range of entropy. Well encrypted files are generally in the 0.97 and above range of entropy. Shannon entropy is a method of calculating entropy for files. Shannon entropy is on a scale of 0-8, which can be converted to the typical 0-1 scaly be simply dividing the Shannon entropy by 8. For example, Shannon entropy gives roshal archive (RAR) compression an entropy of 5.05 (0.6 on 0-1 scale), pretty good privacy (PGP) encryption an entropy of 7.8 (0.97 on 0-1 scale), and TrueCrypt an entropy of 7.99 (0.998 on 0-1 scale). Accordingly, an entropy threshold between simple compression and encryption can be implemented to identify files that have been unintentionally encrypted by ransomware. As an example a threshold, on the 0-1 scale, could be 0.8. If the cloud drive of a user's local drive uses a known (intentional) encryption technique, the system can be set to identify or ignore the intentionally encrypted files, so that they are not identified as attacked files based on entropy.

For example, if encryption is intentionally implemented, then ransomware calculations will need to be adjusted based on the average entropy of the encryption that is being used. There are various applications that will encrypt files before they are put into the cloud. Boxcryptor, for example, is a popular application for doing this. Windows uses Bitlocker and Mac uses Filevault. These encryption types should be able to be distinguished from ransomware encryption.

This could be implemented on standalone files, using current and historical metadata of header information, and/or current and historical content properties of payloads of files. As mentioned above, for standalone files, specific entropies could indicate an attack. Further, an attack may be present if entropies of a certain number of files change significantly enough between current versions and historical versions of the files to establish a pattern of changes that exceeds a predetermined change velocity.

In an implementation, a layered entropy approach can also be used. Layered entropy segments the contents of a file into n-byte segments and calculates the entropy for each segment. This can be helpful when ransomware prepends or appends a file with (a) static bytes such as nulls or (b) known segments of ransomware. This can also be used to determine whether the entropy level of a certain segment of a file significantly deviates from the entropy level of other segments of the file. This could be implemented on standalone files or using current and historical metadata of header information, and/or current and historical content properties of payloads of files. When comparing current and historical information, a pattern of changes between the current and historical information that exceeds a predetermined change velocity may indicate the presence of an attack.

In an implementation, the entropy of a filename can be considered. Ransomware may change the file name. It is even possible to calculate specific entropy for known filenames that ransomware uses. This could be implemented on standalone files or using current and historical metadata of header information, and/or current and historical content properties of payloads of files. When comparing current and historical information, a pattern of changes between the current and historical information that exceeds a predetermined change velocity may indicate the presence of an attack.

In an implementation, a keyword in a filename can be considered. For example, if there is a keyword that indicates ransomware, then there might be an attack. This could be implemented on standalone files or using current and historical metadata of header information, and/or current and historical content properties of payloads of files. When comparing current and historical information, a pattern of changes between the current and historical information that exceeds a predetermined change velocity may indicate the presence of an attack.

In an implementation, a length of a filename and/or extension can be considered. For example, a consideration can be made as to whether the filename or extension is a certain length that is known to ransomware. This might be reliable preliminary check, before implementing a more thorough scanning/detection. This could be implemented on standalone files or using current and historical metadata of header information, and/or current and historical content properties of payloads of files. When comparing current and historical information, a pattern of changes between the current and historical information that exceeds a predetermined change velocity may indicate the presence of an attack.

In an implementation, a true file type of a file or files is a consideration. A true file type is based on the contents of the file, not just what is indicated by the extension. Most files include some type of a signature to indicate what type of file they are. These different signatures are referred to a "magic numbers." For example, a jpeg file will have a specific "magic number" and a gif file will have a different "magic number." Ransomware often strips the "magic number" from the file. The system can detect ransomware by detecting the presence/absence of the "magic number" from the file. The system can also determine if the magic number matches the actual type of the file. This can be done using historical data, such as, for example a lookup table. The magic number may also remain unencrypted even if the file is encrypted. This could be implemented on standalone files or using current and historical metadata of header information, and/or current and historical content properties of payloads of files. When comparing current and historical information, a pattern of changes between the current and historical information that exceeds a predetermined change velocity may indicate the presence of an attack.

In an implementation, whether or not the file or files include a stub can be a consideration. A stub file points to another file that is opened when a user attempts to open the stub file. The presence of a stub file could indicate ransomware. This could be implemented on standalone files or using current and historical metadata of header information, and/or current and historical content properties of payloads of files. When comparing current and historical information, a pattern of changes between the current and historical information that exceeds a predetermined change velocity may indicate the presence of an attack.

In an implementation, whether or not a file or files can be decomposed is a consideration. Most files can be decomposed into many sub-elements. If a file cannot be decomposed it could be ransomware. If the type of file is known to be decomposable and it is not, then this is a stronger indication of ransomware. This could be implemented on standalone files or using current and historical metadata of header information, and/or current and historical content properties of payloads of files. When comparing current and historical information, a pattern of changes between the current and historical information that exceeds a predetermined change velocity may indicate the presence of an attack.

In an implementation, extracted text is a consideration. The system can extract metadata from a header of a file and can extract content properties including text from the payload of a file. If the extracted metadata and/or test can be compared to keywords, key phrases or known ransom notes to determine whether or not an attack is likely. Often ransomware will save a ransom note somewhere in an html, text or image file for example. Usually the ransom note provides information about how to pay the ransom. The ransom note can be detected using keyword/phrases as discussed above. This can also be detected using known filenames, as discussed above. This ties into the other methods discussed above. Some phrases could be "bitcoin gateway," cryptography information like "private key," "decrypt 1 file for free," and other strings specific to known ransomware strains. This could be implemented on standalone files or using current and historical metadata of header information, and/or current and historical content properties of payloads of files. When comparing current and historical information, a pattern of changes between the current and historical information that exceeds a predetermined change velocity may indicate the presence of an attack.

In an implementation, Locality-Sensitive Hashing (LSH) can be performed on content properties including text extracted from files. If the result of the LSH is similar to known ransom notes, then attack may have taken place. We are looking for a "collision" with the LSH of the inspected file and the LSH of a known ransom note. This could be implemented on standalone files or using current and historical metadata of header information, and/or current and historical content properties of payloads of files. When comparing current and historical information, a pattern of changes between the current and historical information that exceeds a predetermined change velocity may indicate the presence of an attack. For example, a change can be identified for each respective file by determining a hamming distance between the LSH for the current metadata (or content properties) and the LSH for the historical metadata (or content properties).

In an implementation, an identification of a known script can be a consideration. For example, a script that is similar to malware can be identified. This could be done using regular text or LSH. This could also apply to detecting certain images. This could be implemented on standalone files or using current and historical metadata of header information, and/or current and historical content properties of payloads of files. When comparing current and historical information, a pattern of changes between the current and historical information that exceeds a predetermined change velocity may indicate the presence of an attack.

In an implementation, whether or not text or metadata can be extracted can be a consideration. If text or metadata cannot be extracted from the file, then encryption may have taken place. This could be implemented on standalone files or using current and historical metadata of header information, and/or current and historical content properties of payloads of files. When comparing current and historical information, a pattern of changes between the current and historical information that exceeds a predetermined change velocity may indicate the presence of an attack.

In an implementation, the existence of a filesize of is a multiple of a known blocksize can be a consideration. Encryption may result in files that are a multiple of a known file size. The block size of a file can be calculated and then compared to multiples of the known file sizes. This can also be done by checking to see if existing files are a multiple of frequently used block sizes of encryption. This could be implemented on standalone files, using current and historical metadata of header information, and/or current and historical content properties of payloads of files. This could be implemented on standalone files or using current and historical metadata of header information, and/or current and historical content properties of payloads of files. When comparing current and historical information, a pattern of changes between the current and historical information that exceeds a predetermined change velocity may indicate the presence of an attack.

In an implementation, an edit distance between current and historical filenames can be a consideration. There are different ways of calculating edit distance. An edit distance threshold can be set (based on the various methods for calculating edit distance). When doing this we can determine how much a filename has changed or how much an extension has changed. This covers the case where a .doc is changed to .docx (no attack) and where a .doc is changed to a .locky.

In an implementation, when malicious behavior is detected, a response can be to quarantine any of the files for which the malicious behavior was detected. Each of the files can be individually quarantined from another or all of the files can be quarantined in the same location. Once the files are quarantined, additional measures can be taken to detect malicious behavior and to further determine whether or not each of the files has been infected. If the files were not infected by a false positive initial detection of malicious activity, the quarantined files can be returned to their original location. If the files were actually infected, then recent backups of the files can be restored.

Handling a New File and Lack of Historical Metadata and/or Historical Content Properties In an implementation, it is determined whether or not historical metadata and/or content properties exist for a particular file. If there is no historical metadata and/or content properties, then the file can be analyzed in a different manner than files for which the historical metadata and/or historical content properties exist. A more thorough inspection (e.g., entropy, filename, contents, etc.) of the file for which there is no historical information can be performed as opposed to files for which there is historical information. This more thorough inspection can be based on a pattern that exceeds a threshold or for any criteria that exceeds a threshold. The pattern or criteria can be based on any of the patterns and/or criteria described in the present application. For example, a file for which no historical information exists can be inspected to see if there is low entropy, whether or not the file type is intact, etc. Further, if there is no historical metadata and/or historical content properties for the file, then the pattern of changes would be influenced accordingly.

Formation of Peer Groups

Peer groups can be formed of similar type users. The basis for forming these groups can be based on any criteria mentioned in this specification or any other criteria that can be uses to assess individuals, such as company, division, project group, previous activities, etc. Once a peer group is identified, one or more of (i) an average change velocity, (ii) moving average of velocities of change and (iii) predetermined thresholds can be determined for any type of data (e.g., non-payload metadata, payload content properties, content property parameters, historical metadata, historical content properties, etc.), as a baseline for the entire peer group. In other words, the peer group converges to form a baseline standard for that particular group. The baseline can change over time based on the activities of the group. However, if one of the members of the peer group deviates (based on some statistical analysis) from the baseline for the entire group, it is likely that malicious activity has taken place and further action can be taken. The determination of whether one of the members deviates from the baseline can be made based on any of the qualifiers described in this specification and any action described in this specification can be implemented accordingly. Additional variations will be clear to a person skilled in this area of endeavor.

Particular Implementations

We describe a system and various implementations for providing security for cloud services. As discussed, this provides for a type of virtual network between clients and cloud services with fine-grained filtering linked to content-type and application-level semantics.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, system architecture, deep API inspection, content monitoring, security actions, conclusion and particular implementations, etc.

These methods can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, these methods are described with reference to the system that carries out a method. The system is not necessarily part of the method.

Other implementations of the methods described in this section can include a non-transitory computer readable storage medium storing instructions executable by a processor to perform any of the methods described above. Yet another implementation of the methods described in this section can include a system including memory and one or more processors operable to execute instructions, stored in the memory, to perform any of the methods described above.

Some example implementations are listed below with certain implementations dependent upon the implementation to which they refer to. Brief descriptions of each implementation are provided as a header for each respective implementation:

Method: Non-Payload (i.e., Header) Metadata, Historical Metadata, Predetermined Change Velocity and Independent Data Store (e.g., Cloud Storage)

In one implementation, a method of detecting and responding to a data attack on a file system stored on an independent data store is provided. The method may include repeatedly scanning a list to identify files in the file system of the independent data store that have been updated within a determined timeframe and assembling current metadata for respective files identified by the scanning, the current metadata assembled from file system lists for and file headers of the respective files. The method may further include accessing a historical metadata store storing historical metadata to obtain the historical metadata of the respective files, wherein the stored historical metadata is maintained independently from and not under control of the file system and the historical metadata store preserves generations of metadata describing files in the file system such that prior generation metadata remains available after a file and file metadata have been updated in the file system and determining, by an inspective agent or an active agent, that a malicious activity is in process by analyzing the current metadata of the respective files and the historical metadata of the respective files to identify a pattern of changes from the historical metadata to the current metadata of the respective files that exceeds a predetermined change velocity. Additionally, the method can include determining, by the inspective agent or the active agent, that the malicious activity is in process by analyzing the current metadata of the respective files and known patterns of malicious metadata that indicate a known malicious file modification to identify a match between the current metadata of the respective files and the known patterns of malicious metadata that indicate the known malicious file modification; determining a machine and/or user that initiated the malicious activity, and responsive to the determining of the machine and/or user that initiated the malicious activity, implementing a response mechanism that restricts file modifications by the determined machine and/or user.

Compiling/Storing Historical Metadata Introspectively

In another implementation the historical metadata can be compiled and stored on an ongoing basis, introspectively, on the historical metadata store.

Compiling/Storing Historical Metadata Actively

In an implementation the historical metadata may be compiled and stored on an ongoing basis, actively, on the historical metadata store.

Metadata Includes Computed Entropy of Filename of Each File

In a further implementation the current metadata and the historical metadata can include a computed entropy of a filename of each respective file.

Metadata Includes Magic Number of Each File

In an implementation the current metadata and the historical metadata may include a magic number indicating a file type of each respective file.

Metadata Includes Extension of Filename of Each File

Further, in an implementation the current metadata and the historical metadata can include an extension of a filename of each respective file.

Edit Distance of Filename of Each File

Another implementation may include determining, by the inspective agent or the active agent, that the malicious activity is in process by analyzing the current metadata of the respective files and the historical metadata of the respective files to identify a pattern of changes in edit distances of filenames between the current metadata and the historical metadata of the respective files that exceeds a predetermined filename edit distance change velocity.

Metadata Cannot be Extracted Indicator

In an implementation, the current metadata and the historical metadata include a metadata cannot be extracted indicator that indicates when metadata cannot be extracted from each respective file.

Response Mechanism Notifies an Owner

According to an implementation, the response mechanism includes notifying the machine and/or user that the malicious activity was detected, and providing a location of the malicious activity to the machine and/or user.

Response Mechanism Isolates the Independent Data Store

According to another implementation, the response mechanism includes isolating the independent data store by disconnecting the determined machine and/or user from the independent data store and by disconnecting additional users who have access to the independent data store and preventing the determined machine and/or user from accessing the independent data store.

Response Mechanism Performs a Backup of Files

In an implementation, the response mechanism includes at least one of performing a backup of the respective files identified by the scanning and performing a backup of the independent data store on which the respective files are stored.

Response Mechanism Broadens the Scan to Include More Drives

A further implementation has the response mechanism force the determined machine and/or user to perform a local scan for the malicious activity, force a scan for the malicious activity on any other independent data store for which the determined machine and/or user has access, force additional users who have access to the independent data store to perform the local scan for the malicious activity, and force a scan for the malicious activity on any other independent data store for which the additional users have access.

Response Mechanism Restores a Backup of the Independent Data Store

In another implementation the response mechanism restores a previous backup of the independent data store, wherein the restoring of the previous backup is automated or performed with user interaction.

Response Mechanism Classifies an Attack

According to an implementation the response mechanism determines a creator/author of a file having caused the malicious activity to be initiated on the determined machine and/or user based on the current metadata and the historical metadata, and identifies and performs a specific response mechanism of multiple response mechanisms based on the determined creator/author.

Second Layer of Detection Eliminates User-Encrypted Files and Re-Runs Detection

In an implementation the response mechanism includes: calculating an entropy of a payload of the respective files, comparing the entropy of the respective files with entropies of known user-initiated encryption techniques to determine whether or not the determined machine and/or user has implemented a user-initiated encryption technique, identifying each of the respective files for which the determined machine and/or user has implemented the user-initiated encryption technique, determining that the malicious activity is in process by analyzing the current metadata of the files and historical metadata of the files, excluding the respective files for which the determined machine and/or user has implemented the user-initiated encryption technique, to identify the pattern of changes between the current metadata and the historical metadata of the files that exceeds the predetermined change velocity, and determining that the malicious activity is in process by analyzing (i) the current metadata of the files, excluding the respective files for which the determined machine and/or user has implemented the user-initiated encryption technique, and (ii) known patterns of malicious metadata that indicate a known malicious file modification to identify a match between the current metadata of the files, excluding the respective files for which the determined machine and/or user has implemented the user-initiated encryption technique, and the known patterns of malicious metadata.

Second Layer of Detection is Velocity Based

According to an implementation the response mechanism includes performing a second layer of detection including assembling current content property parameters for each respective file of the files identified by the scanning, repeatedly calculating a moving average of velocities of change for the current content property parameters of the identified files by, for each respective parameter of the current content property parameters, maintaining a buffer of time-based parameter change statistics, and in a moving time-based window applied to the buffer, calculating the moving average of velocity of change for the respective parameter, detecting that a second level of malicious activity is in process by identifying when there is a statistically significant acceleration in the calculated moving average of velocities of change for the current content property parameters, and responding to the detected second level of malicious activity by implementing a secondary response mechanism that restricts file modifications by the determined machine and/or user.

Second Layer of Detection is Content (i.e., Payload) Based

In an implementation the response mechanism includes performing a second level of detection including reading a payload of the respective files identified by the scanning, calculating payload content properties for the respective files from the payload of the respective files, accessing a historical content properties store storing historical payload content properties to obtain the historical payload content properties assembled based on read payloads of the respective files, wherein the stored historical payload content properties are maintained independently from and not under control of the file system and the historical content properties store preserves generations of payload content properties describing files in the file system such that prior generation payload content properties remain available after a file and file payload content properties have been updated in the file system. The second level of detection further includes detecting that a second level of malicious activity is in process by analyzing the current payload content properties of the respective files and the historical payload content properties of the respective files to identify a pattern of changes between the current payload content properties and the historical payload content properties of the respective files that exceeds the predetermined change velocity, and responding to the detected second level of malicious activity by implementing a secondary response mechanism that restricts file modifications by the determined machine and/or user.

Single File Exceeds Threshold

An implementation further includes comparing the current metadata of each respective file of the respective files to the historical metadata of each respective file of the respective files, determining a difference for each respective file based on the comparing of the current metadata of each respective file and the historical metadata of each respective file, and determining that the malicious activity is in process when the determined difference for any of the respective files exceeds a predetermined change threshold.

Method: Payload Content Properties, Historical Content Properties, Predetermined Change Velocity and Independent Data Store (e.g., Cloud Storage)

In one implementation a method of detecting and responding to a data attack on a file system stored on an independent data store is provided. The method can include repeatedly scanning a list to identify files in the file system of the independent data store that have been updated within a determined timeframe, reading a payload of respective files identified by the scanning; calculating current content properties for the respective files from the payload of the respective files, and accessing a historical content properties store storing historical content properties to obtain the historical content properties assembled based on read payloads of the respective files, wherein the stored historical content properties are maintained independently from and not under control of the file system and the historical content properties store preserves generations of content properties describing files in the file system such that prior generation content properties remain available after a file and file content properties have been updated in the file system. The method may further include determining, by an inspective agent or an active agent, that a malicious activity is in process by analyzing the current content properties of the respective files and the historical content properties of the respective files to identify a pattern of changes between the current content properties and the historical content properties of the respective files that exceeds a predetermined change velocity, determining, by the inspective agent or the active agent, that the malicious activity is in process by analyzing the current content properties of the respective files and known patterns of malicious content properties that indicate a known malicious file modification to identify a match between the current content properties of the respective files and the known patterns of malicious content properties that indicate the known malicious file modification, determining a machine and/or user that initiated the malicious activity, and responsive to the determining of the machine and/or user that initiated the malicious activity, implementing a response mechanism that restricts file modifications by the determined machine and/or user.

Compiling/Storing Historical Content Properties Introspectively

In another implementation the historical content properties can be compiled and stored on an ongoing basis, introspectively, on the historical content properties store.

Compiling/Storing Historical Content Properties Actively

In a further implementation the historical content properties may be compiled and stored on an ongoing basis, actively, on the historical content properties store.

Computed Entropy of Payload of Each File

In an implementation the current content properties and the historical content properties may include a computed entropy of the payload of each respective file.

Layered Entropy of Payload of Each File

An implementation my further include the current content properties and the historical content properties including a computed layered entropy of the payload of each respective file.

Locality-Sensitive Hashing of Payload of Each File

Further, an implementation may include the current content properties and the historical content properties including locality-sensitive hashing (LSH) of the payload of each respective file, such that a change can be identified for each respective file by determining a hamming distance between the LSH for the current content properties and the LSH for the historical content properties.

Stub of Payload of Each File

In an implementation the current content properties and the historical content properties include occurrences of a stub in the payload of each respective file.

Integrity Indicator for Payload of Each File

An implementation also includes the current content properties and the historical content properties having an integrity indicator that indicates whether or not there is document object integrity of a structure of the payload of each respective file.

Existence of Keywords in Payload of Each File

According to another implementation the current content properties and the historical content properties include a count of occurrences, within the payload of each respective file, of known keywords associated with the malicious activity for each respective file.

Existence of Known Ransom Note

Another implementation includes determining, by the inspective agent or the active agent, that the malicious activity is in process when the current content properties of any respective file indicates an existence of a known ransom note of an attacker.

Response Mechanism Notifies Owner

In an implementation the response mechanism includes notifying the machine and/or user that the malicious activity was detected, and providing a location of the malicious activity to the machine and/or user.

Response Mechanism Isolated the Independent Data Store

According to an implementation the response mechanism includes isolating the independent data store by disconnecting the determined machine and/or user from the independent data store and by disconnecting additional users who have access to the independent data store, and preventing the determined machine and/or user from accessing the independent data store.

Response Mechanism Restores a Backup of Files

A further implementation includes the response mechanism restoring a previous backup of the independent data store, wherein the restoring of the previous backup is automated or performed with user interaction.

Response Mechanism Performs a Backup of Files

In an implementation the response mechanism includes at least one of performing a backup of the respective files identified by the scanning and performing a backup of the independent data store on which the respective files are stored.

Response Mechanism Broadens the Scan to Include More Drives

In one implementation the response mechanism forces the determined machine and/or user to perform a local scan for the malicious activity, forces a scan for the malicious activity on any other independent data store for which the determined machine and/or user has access, forces additional users who have access to the independent data store to perform the local scan for the malicious activity, and forces a scan for the malicious activity on any other independent data store for which the additional users have access.

Response Mechanism Classifies an Attack

An implementation incudes the response mechanism determining a creator of a file having caused the malicious activity to be initiated on the determined machine and/or user based on the current content properties and the historical content properties, and identifying and performing a specific response mechanism of multiple response mechanisms based on the determined creator.

Second Layer of Detection Eliminates User-Encrypted Files and Re-Runs Detection

In a further implementation the response mechanism includes calculating an entropy of the payload of the respective files; comparing the entropy of the respective files with entropies of known user-initiated encryption techniques to determine whether or not the determined machine and/or user has implemented a user-initiated encryption technique, identifying each of the respective files for which the determined machine and/or user has implemented the user-initiated encryption technique, determining that the malicious activity is in process by analyzing the current content properties of the files and the historical content properties of the files, excluding the respective files for which the determined machine and/or user has implemented the user-initiated encryption technique, to identify the pattern of changes between the current content properties and the historical content properties of the files that exceeds a predetermined change velocity, and determining that the malicious activity is in process by analyzing (i) the current content properties of the files, excluding the respective files for which the determined machine and/or user has implemented the user-initiated encryption technique, and (ii) known patterns of malicious content properties that indicate a known malicious file modification to identify a match between the current content properties of the files, excluding the respective files for which the determined machine and/or user has implemented the user-initiated encryption technique, and the known patterns of malicious content properties.

Second Layer of Detection is Velocity Based

In an implementation the response mechanism includes performing a second layer of detection. The second layer of detection includes assembling current content property parameters for each respective file of the files identified by the scanning, repeatedly calculating a moving average of velocities of change for the current content property parameters of the identified files by, for each respective parameter of the current content property parameters, maintaining a buffer of time-based parameter change statistics, and in a moving time-based window applied to the buffer, calculating the moving average of velocity of change for the respective parameter, detecting that a second level of malicious activity is in process by identifying when there is a statistically significant acceleration in the calculated moving average of velocities of change for the current content property parameters, and responding to the detected second level of malicious activity by implementing a secondary response mechanism that restricts file modifications by the determined machine and/or user.

Single File Exceeds Threshold

Another implementation includes comparing the current content properties of each respective file of the respective files to the historical content properties of each respective file of the respective files, determining a difference for each respective file based on the comparing of the current content properties of each respective file and the historical content properties of each respective file, and determining that the malicious activity is in process when the determined difference for any of the respective files exceeds a predetermined change threshold.

Method: Content Property Parameters, No Historical Information, Moving Average of Velocities of Changes, and Independent Data Store (e.g., Cloud Storage)

In one implementation a method of detecting and responding to a data attack on a file system stored on an independent data store is provided. The method includes repeatedly scanning a list to identify files in the file system of the independent data store that have been updated within a determined timeframe, assembling current content property parameters for each respective file of the files identified by the scanning, repeatedly calculating, by an inspective agent or an active agent, a moving average of velocities of change for the current content property parameters of the identified files by, for each respective parameter of the current content property parameters, maintaining a buffer of time-based parameter change statistics, and in a moving time-based window applied to the buffer, calculating the moving average of velocity of change for the respective parameter, determining, by the inspective agent or the active agent, that a malicious activity is in process by identifying when there is a statistically significant acceleration in the calculated moving average of velocities of change for the current content property parameters, determining a machine and/or user that initiated the malicious activity, and responsive to the determining of the machine and/or user that initiated the malicious activity, implementing a response mechanism that restricts file modifications by the determined machine and/or user.

Storing Moving Average of Velocities of Change Introspectively

In another implementation calculated moving average of velocities of change is stored on an ongoing basis, introspectively, on a moving average of velocities of change store.

Storing Moving Average of Velocities of Actively

In a further implementation the calculated moving average of velocities of change is stored on an ongoing basis, actively, on a moving average of velocities of change store.

Content Property Parameters Include Computed Entropy of a Filename

In an implementation the current content property parameters include a computed entropy of a filename of each respective file.

Content Property Parameters Include a Magic Number of Each File

According to an implementation the current content property parameters include a magic number indicating a file type of each respective file.

Content Property Parameters Include an Extension of Each File

In another implementation the current content property parameters include an extension of a filename of each respective file.

Content Property Parameters Include an Edit Distance of a Filename of Each File

In an implementation the current content property parameters include an edit distance of a filename of each respective file.

Content Property Parameters Include Indicator of Whether Metadata Can be Extracted In one implementation the current content property parameters include whether metadata can be extracted from each respective file.

Response Mechanism Notifies an Owner

In a further implementation the response mechanism includes notifying the machine and/or user that the malicious activity was detected, and providing a location of the malicious activity to the machine and/or user.

Response Mechanism Isolates the Independent Data Store

In an implementation the response mechanism includes isolating the independent data store by disconnecting the determined machine and/or user from the independent data store and by disconnecting additional users who have access to the independent data store, and preventing the determined machine and/or user from accessing the independent data store.

Response Mechanism Restores a Backup of the Independent Data Store

In an additional implementation the response mechanism includes restoring a previous backup of the independent data store, wherein the restoring of the previous backup is automated or performed with user interaction.

Response Mechanism Performs a Backup of Files

According to an implementation the response mechanism includes at least one of performing a backup of the respective files identified by the scanning and performing a backup of the independent data store on which the respective files are stored.

Response Mechanism Broadens the Scan to Include More Drives

In an implementation the response mechanism includes forcing the determined machine and/or user to perform a local scan for the malicious activity, forcing a scan for the malicious activity on any other independent data store for which the determined machine and/or user has access, forcing additional users who have access to the independent data store to perform the local scan for the malicious activity, and forcing a scan for the malicious activity on any other independent data store for which the additional users have access.

Response Mechanism Classifies an Attack

In another implementation the response mechanism includes determining a creator of a file having caused the malicious activity to be initiated on the determined machine and/or user based on the current content property, and identifying and performing a specific response mechanism of multiple response mechanisms based on the determined creator.

System: Non-Payload (i.e., Header) Metadata, Historical Metadata, Predetermined Change Velocity and Independent Data Store (e.g., Cloud Storage)

A system for detecting and responding to a data attack on a file system stored on an independent data store is provided. The system includes one or more processors, and a memory including instructions that, when executed by the one or more processors, cause the one or more processors to (i) repeatedly scan a list to identify files in the file system of the independent data store that have been updated within a determined timeframe, (ii) assemble current metadata for respective files identified by the scan, the current metadata assembled from file system lists for and file headers of the respective files, (iii) accesses a historical metadata store storing historical metadata to obtain the historical metadata of the respective files, wherein the stored historical metadata is maintained independently from and not under control of the file system and the historical metadata store preserves generations of metadata describing files in the file system such that prior generation metadata remains available after a file and file metadata have been updated in the file system, (iv) determine, by an inspective agent or an active agent, that a malicious activity is in process by analyzing the current metadata of the respective files and the historical metadata of the respective files to identify a pattern of changes from the historical metadata to the current metadata of the respective files that exceeds a predetermined change velocity, (v) determine, by the inspective agent or the active agent, that the malicious activity is in process by analyzing the current metadata of the respective files and known patterns of malicious metadata that indicate a known malicious file modification to identify a match between the current metadata of the respective files and the known patterns of malicious metadata that indicate the known malicious file modification, (vi) determine a machine and/or user that initiated the malicious activity, and (vii) responsive to the determination of the machine and/or user that initiated the malicious activity, implement a response mechanism that restricts file modifications by the determined machine and/or user.

System: Payload Content Properties, Historical Content Properties, Predetermined Change Velocity and Independent Data Store (e.g., Cloud Storage)

In an implementation a system for detecting and responding to a data attack on a file system stored on an independent data store is provided. The system includes one or more processors, and a memory including instructions that, when executed by the one or more processors, cause the one or more processors to repeatedly scan a list to identify files in the file system of the independent data store that have been updated within a determined timeframe, read a payload of respective files identified by the scan, calculate current content properties for the respective files from the payload of the respective files, access a historical content properties store storing historical content properties to obtain the historical content properties assembled based on read payloads of the respective files, wherein the stored historical content properties are maintained independently from and not under control of the file system and the historical content properties store preserves generations of content properties describing files in the file system such that prior generation content properties remain available after a file and file content properties have been updated in the file system, determine, by an inspective agent or an active agent, that a malicious activity is in process by analyzing the current content properties of the respective files and the historical content properties of the respective files to identify a pattern of changes between the current content properties and the historical content properties of the respective files that exceeds a predetermined change velocity, determine, by the inspective agent or the active agent, that the malicious activity is in process by analyzing the current content properties of the respective files and known patterns of malicious content properties that indicate a known malicious file modification to identify a match between the current content properties of the respective files and the known patterns of malicious content properties that indicate the known malicious file modification, determine a machine and/or user that initiated the malicious activity, and responsive to the determination of the machine and/or user that initiated the malicious activity, implement a response mechanism that restricts file modifications by the determined machine and/or user.

System: Content Property Parameters, No Historical Information, Moving Average of Velocities of Changes and Independent Data Store (e.g., Cloud Storage)

In one implementation a system for detecting and responding to a data attack on a file system stored on an independent data store is provided. The system includes one or more processors, and a memory including instructions that, when executed by the one or more processors, cause the one or more processors to repeatedly scan a list to identify files in the file system of the independent data store that have been updated within a determined timeframe, assemble current content property parameters for each respective file of the files identified by the scan, repeatedly calculate, by an inspective agent or an active agent, a moving average of velocities of change for the current content property parameters of the identified files by, for each respective parameter of the current content property parameters, maintaining a buffer of time-based parameter change statistics; and in a moving time-based window applied to the buffer, calculating the moving average of velocity of change for the respective parameter; determine, by the inspective agent or the active agent, that a malicious activity is in process by identifying when there is a statistically significant acceleration in the calculated moving average of velocities of change for the current content property parameters. The instructions further cause the one or more processors to determine a machine and/or user that initiated the malicious activity, and responsive to the determination of the machine and/or user that initiated the malicious activity, implementing a response mechanism that restricts file modifications by the determined machine and/or user.

Recording Medium: Non-Payload (i.e., Header) Metadata, Historical Metadata, Predetermined Change Velocity and Independent Data Store (e.g., Cloud Storage)

In another implementation a non-transitory computer-readable recording medium having instructions recorded thereon is provided. The instructions, when executed, cause at least one processor to perform a method including repeatedly scanning a list to identify files in the file system of the independent data store that have been updated within a determined timeframe, assembling current metadata for respective files identified by the scanning, the current metadata assembled from file system lists for and file headers of the respective files, accessing a historical metadata store storing historical metadata to obtain the historical metadata of the respective files, wherein the stored historical metadata is maintained independently from and not under control of the file system and the historical metadata store preserves generations of metadata describing files in the file system such that prior generation metadata remains available after a file and file metadata have been updated in the file system; determining, by an inspective agent or an active agent, that a malicious activity is in process by analyzing the current metadata of the respective files and the historical metadata of the respective files to identify a pattern of changes from the historical metadata to the current metadata of the respective files that exceeds a predetermined change velocity, determining, by the inspective agent or the active agent, that the malicious activity is in process by analyzing the current metadata of the respective files and known patterns of malicious metadata that indicate a known malicious file modification to identify a match between the current metadata of the respective files and the known patterns of malicious metadata that indicate the known malicious file modification; determining a machine and/or user that initiated the malicious activity, and responsive to the determining of the machine and/or user that initiated the malicious activity, implementing a response mechanism that restricts file modifications by the determined machine and/or user.

Recording Medium: Content Property Parameters, Historical Content Properties, Predetermined Change Velocity and Independent Data Store (e.g., Cloud Storage)

In a further implementation a non-transitory computer-readable recording medium having instructions recorded thereon is provided. The instructions, when executed, cause at least one processor to perform a method including repeatedly scanning a list to identify files in the file system of the independent data store that have been updated within a determined timeframe, reading a payload of respective files identified by the scanning, calculating current content properties for the respective files from the payload of the respective files, accessing a historical content properties store storing historical content properties to obtain the historical content properties assembled based on read payloads of the respective files, wherein the stored historical content properties are maintained independently from and not under control of the file system and the historical content properties store preserves generations of content properties describing files in the file system such that prior generation content properties remain available after a file and file content properties have been updated in the file system, determining, by an inspective agent or an active agent, that a malicious activity is in process by analyzing the current content properties of the respective files and the historical content properties of the respective files to identify a pattern of changes between the current content properties and the historical content properties of the respective files that exceeds a predetermined change velocity, determining, by the inspective agent or the active agent, that the malicious activity is in process by analyzing the current content properties of the respective files and known patterns of malicious content properties that indicate a known malicious file modification to identify a match between the current content properties of the respective files and the known patterns of malicious content properties that indicate the known malicious file modification, determining a machine and/or user that initiated the malicious activity, and responsive to the determining of the machine and/or user that initiated the malicious activity, implementing a response mechanism that restricts file modifications by the determined machine and/or user.

Computer-Readable Recording Medium: Content Property Parameters, No Historical Information, Moving Average of Velocities of Changes and Independent Data Store (e.g., Cloud Storage)

In another implementation a non-transitory computer-readable recording medium having instructions recorded thereon is provided. The instructions, when executed, cause at least one processor to perform a method including repeatedly scanning a list to identify files in the file system of the independent data store that have been updated within a determined timeframe, assembling current content property parameters for each respective file of the files identified by the scanning; repeatedly calculating, by an inspective agent or an active agent, a moving average of velocities of change for the current content property parameters of the identified files by, for each respective parameter of the current content property parameters, maintaining a buffer of time-based parameter change statistics, and in a moving time-based window applied to the buffer, calculating the moving average of velocity of change for the respective parameter, determining, by the inspective agent or the active agent, that a malicious activity is in process by identifying when there is a statistically significant acceleration in the calculated moving average of velocities of change for the current content property parameters, determining a machine and/or user that initiated the malicious activity, and responsive to the determining of the machine and/or user that initiated the malicious activity, implementing a response mechanism that restricts file modifications by the determined machine and/or user.

Method: Non-Payload (i.e., Header) Metadata, Historical Metadata, Volume of Changes and Independent Data Store (e.g., Cloud Storage)

In one implementation, a method of detecting and responding to a data attack on a file system stored on an independent data store is provided. The method includes repeatedly scanning a list to identify files in the file system of the independent data store that have been updated within a determined timeframe, assembling current metadata for respective files identified by the scanning, the current metadata assembled from file system lists for and file headers of the respective files, accessing a historical metadata store storing historical metadata to obtain the historical metadata of the respective files, wherein the stored historical metadata is maintained independently from and not under control of the file system and the historical metadata store preserves generations of metadata describing files in the file system such that prior generation metadata remains available after a file and file metadata have been updated in the file system, determining, by an inspective agent or an active agent, that a malicious activity is in process by analyzing the current metadata of the respective files and the historical metadata of the respective files to identify a volume of changes from the historical metadata to the current metadata of the respective files that exceeds a predetermined change volume, determining, by the inspective agent or the active agent, that the malicious activity is in process by analyzing the current metadata of the respective files and known patterns of malicious metadata that indicate a known malicious file modification to identify a match between the current metadata of the respective files and the known patterns of malicious metadata that indicate the known malicious file modification, determining a machine and/or user that initiated the malicious activity, and responsive to the determining of the machine and/or user that initiated the malicious activity, implementing a response mechanism that restricts file modifications by the determined machine and/or user.

Method: Payload Content Properties, Historical Content Properties, Volume of Changes and Independent Data Store (e.g., Cloud Storage)

In a further implementation a method of detecting and responding to a data attack on a file system stored on an independent data store is provided. The method includes repeatedly scanning a list to identify files in the file system of the independent data store that have been updated within a determined timeframe, reading a payload of respective files identified by the scanning; calculating current content properties for the respective files from the payload of the respective files, accessing a historical content properties store storing historical content properties to obtain the historical content properties assembled based on read payloads of the respective files, wherein the stored historical content properties are maintained independently from and not under control of the file system and the historical content properties store preserves generations of content properties describing files in the file system such that prior generation content properties remain available after a file and file content properties have been updated in the file system, determining, by an inspective agent or an active agent, that a malicious activity is in process by analyzing the current content properties of the respective files and the historical content properties of the respective files to identify a volume of changes between the current content properties and the historical content properties of the respective files that exceeds a predetermined change volume, determining, by the inspective agent or the active agent, that the malicious activity is in process by analyzing the current content properties of the respective files and known patterns of malicious content properties that indicate a known malicious file modification to identify a match between the current content properties of the respective files and the known patterns of malicious content properties that indicate the known malicious file modification, determining a machine and/or user that initiated the malicious activity, and responsive to the determining of the machine and/or user that initiated the malicious activity, implementing a response mechanism that restricts file modifications by the determined machine and/or user.

Method: Non-Payload (i.e., Header) Metadata, Historical Metadata, Predetermined Change Velocity and Local (Client)

In another implementation a method of detecting and responding to a data attack on a local file system of a local device synchronized to a file system of an independent data store is provided. The method includes repeatedly scanning a list to identify files in the local file system that have been updated within a determined timeframe, assembling current metadata for respective files identified by the scanning, the current metadata assembled from local file system lists for and file headers of the respective files, accessing a historical metadata store storing historical metadata to obtain the historical metadata of the respective files, wherein the stored historical metadata is maintained independently from and not under control of the local file system and the file system of the independent data store and the historical metadata store preserves generations of metadata describing files in the file system such that prior generation metadata remains available after a file and file metadata have been updated in the file system, determining, by a client agent on the local device, that a malicious activity is in process by analyzing the current metadata of the respective files and the historical metadata of the respective files to identify a pattern of changes from the historical metadata to the current metadata of the respective files that exceeds a predetermined change velocity; determining, by the client agent, that the malicious activity is in process by analyzing the current metadata of the respective files and known patterns of malicious metadata that indicate a known malicious file modification to identify a match between the current metadata of the respective files and the known patterns of malicious metadata that indicate the known malicious file modification; determining a machine and/or user that initiated the malicious activity, and responsive to the determining of the machine and/or user that initiated the malicious activity, implementing a response mechanism that restricts file modifications to the local file system of the local device and the file system of the independent data store by the determined machine and/or user.

Method: Payload Content Properties, Historical Content Properties, Predetermined Change Velocity and Local (Client)

In one implementation a method of detecting and responding to a data attack on a local file system of a local device synchronized to a file system of an independent data store is provided. The method includes repeatedly scanning a list to identify files in the local file system of the independent data store that have been updated within a determined timeframe, reading a payload of respective files identified by the scanning; calculating current content properties for the respective files from the payload of the respective files, accessing a historical content properties store storing historical content properties to obtain the historical content properties assembled based on read payloads of the respective files, wherein the stored historical content properties are maintained independently from and not under control of the local file system and the file system of the independent data store and the historical content properties store preserves generations of content properties describing files in the file system such that prior generation content properties remain available after a file and file content properties have been updated in the file system; determining, by a client agent on the local device, that a malicious activity is in process by analyzing the current content properties of the respective files and the historical content properties of the respective files to identify a pattern of changes between the current content properties and the historical content properties of the respective files that exceeds a predetermined change velocity, determining, by the client agent, that the malicious activity is in process by analyzing the current content properties of the respective files and known patterns of malicious content properties that indicate a known malicious file modification to identify a match between the current content properties of the respective files and the known patterns of malicious content properties that indicate the known malicious file modification; determining a machine and/or user that initiated the malicious activity, and responsive to the determining of the machine and/or user that initiated the malicious activity, implementing a response mechanism that restricts file modifications to the local file system of the local device and the file system of the independent data store by the determined machine and/or user.

Method: Non-Payload (i.e., Header) Metadata, No Historical Metadata, Predetermined Threshold and Independent Data Store (e.g., Cloud Storage)

In a further implementation, a method of detecting and responding to a data attack on a file system stored on an independent data store is provided. The method includes repeatedly scanning a list to identify files in the file system of the independent data store that have been updated within a determined timeframe, assembling current metadata for respective files identified by the scanning, the current metadata assembled from file system lists for and file headers of the respective files, accessing a historical metadata store storing historical metadata to obtain the historical metadata of the respective files, wherein the stored historical metadata is maintained independently from and not under control of the file system and the historical metadata store preserves generations of metadata describing files in the file system such that prior generation metadata remains available after a file and file metadata have been updated in the file system, determining, by an inspective agent or an active agent, that a malicious activity is in process (i) when the historical metadata does not exist for the respective files and (ii) when a pattern of the current metadata of the respective files exceeds a predetermined threshold, determining, by the inspective agent or the active agent, that the malicious activity is in process by analyzing the current metadata of the respective files and known patterns of malicious metadata that indicate a known malicious file modification to identify a match between the current metadata of the respective files and the known patterns of malicious metadata that indicate the known malicious file modification, determining a machine and/or user that initiated the malicious activity, and responsive to the determining of the machine and/or user that initiated the malicious activity, implementing a response mechanism that restricts file modifications by the determined machine and/or user.

Method: Payload Content Properties, No Historical Content Propertied, Predetermined Threshold and Independent Data Store (e.g., Cloud Storage)

Another implementation provides a method of detecting and responding to a data attack on a file system stored on an independent data store. The method includes repeatedly scanning a list to identify files in the file system of the independent data store that have been updated within a determined timeframe; reading a payload of respective files identified by the scanning, calculating current content properties for the respective files from the payload of the respective files, accessing a historical content properties store storing historical content properties to obtain the historical content properties assembled based on read payloads of the respective files, wherein the stored historical content properties are maintained independently from and not under control of the file system and the historical content properties store preserves generations of content properties describing files in the file system such that prior generation content properties remain available after a file and file content properties have been updated in the file system, determining, by an inspective agent or an active agent, that a malicious activity is in process (i) when the historical content properties do not exist for the respective files and (ii) when a pattern of the current content properties of the respective files exceeds a predetermined threshold, determining, by the inspective agent or the active agent, that the malicious activity is in process by analyzing the current content properties of the respective files and known patterns of malicious content properties that indicate a known malicious file modification to identify a match between the current content properties of the respective files and the known patterns of malicious content properties that indicate the known malicious file modification, determining a machine and/or user that initiated the malicious activity, and responsive to the determining of the machine and/or user that initiated the malicious activity, implementing a response mechanism that restricts file modifications by the determined machine and/or user.

Examples of various feature combinations (e.g., implementations A-I) described above are provided in the following table. These are only examples and many other possible combinations of features can exist and will be readily apparent to a person of ordinary skill in the art.

| Implementation | What is Analyzed? | Historical Info? | Method of Detection | Cloud or Local? |
| --- | --- | --- | --- | --- |
| A | Non-Payload Metadata | Yes | Predetermined Change Velocity | Cloud |
| B | Payload Content Properties | Yes | Predetermined Change Velocity | Cloud |
| C | Content Property Parameters | No | Moving Average of Velocities of Change | Cloud |
| D | Non-Payload Metadata | Yes | Volume of Changes | Cloud |
| E | Payload Content Properties | Yes | Volume of Changes | Cloud |
| F | Non-Payload Metadata | Yes | Predetermined Change Velocity | Local |
| G | Payload Content Properties | Yes | Predetermined Change Velocity | Local |
| H | Non-Payload Metadata | No | Predetermined Threshold | Cloud |
| I | Payload Content Properties | No | Predetermined Threshold | Cloud |

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed. Further, any of the implementations, such as the method implementations described above, can be implemented in a system as well as a non-transitory computer readable recording medium with instructions recorded thereon.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method of detecting a ransomware attack impacting a cloud-based file storage service, the method comprising:
   collecting metadata on files stored on the cloud-based file storage service, wherein:
   the collecting the metadata comprises:
   collecting a first portion of the metadata using an inspective agent of a proxy device through an application programming interface to the cloud-based file storage service; and collecting a second portion of the metadata using a client agent installed locally on client devices that manipulate the files stored on the cloud-based file storage service, the cloud-based file storage service supports manipulation by creating, editing, and sharing the files, and the collected metadata includes at least one of an extension of a file name, a magic number, and a size;

storing the collected metadata as historical metadata in a historical metadata storage, wherein the historical metadata storage is separate from and not under control of the cloud-based file storage service;

detecting multiple artifacts of the ransomware attack resulting from ransomware manipulation of the files, the detecting including:

comparing at least one of the extension, the magic number and the size included in the historical metadata to at least one of the extension, the magic number and the size included in current metadata of the files to identify a volume of changes in the files, and detecting that the identified volume of changes exceeds a predetermined change volume to determine that the ransomware attack is in progress;

identifying a user and/or client device of the client devices that manipulated the files exhibiting the multiple artifacts; and responding to the determination that the ransomware attack is in progress, wherein the responding comprises:

restricting further manipulation of other files on the cloud-based file storage service by the identified user and/or client device.

2. The method of claim 1, wherein:

the collecting the metadata further comprises collecting a third portion of the metadata using an active agent of the proxy device; and the proxy device is positioned between the client devices and the cloud-based file storage service.

3. The method of claim 1, wherein the responding further comprises:

notifying the user and/or client device that the ransomware attack was detected; and providing a location of the ransomware attack to the user and/or client device.

4. The method of claim 1, wherein the responding further comprises:

isolating the cloud-based file storage service, the isolating comprising:

disconnecting the identified user and/or client device from the cloud-based file storage service, and disconnecting additional users who have access to the cloud-based file storage service; and preventing the identified user and/or client device from accessing the cloud-based file storage service.

5. The method of claim 1, wherein the responding further comprises at least one of performing a backup of the files and performing a backup of the cloud-based file storage service on which the files are stored.

6. The method of claim 1, wherein the responding further comprises:

forcing the identified user and/or client device to perform a local scan for the ransomware attack; forcing a scan for the ransomware attack on any other cloud-based file storage service for which the identified user and/or client device has access;

forcing additional users who have access to the cloud-based file storage service to perform the local scan for the ransomware attack; and forcing a scan for the ransomware attack on any other cloud-based file storage service for which the additional users have access.

7. The method of claim 1, wherein:

the responding further comprises restoring a previous backup of the cloud-based file storage service; and the restoring of the previous backup is automated or performed with user interaction.

8. The method of claim 1, wherein the responding further comprises:

determining a creator of a file having caused the ransomware attack to be initiated on the identified user and/or client device based on the current metadata and the historical metadata; and identifying and performing a specific response mechanism of multiple response mechanisms based on the determined creator.

9. A method of detecting a ransomware attack impacting a cloud-based file storage service, the method comprising:

collecting content properties from payloads of files stored on the cloud-based file storage service, wherein:

the collecting the content properties comprises:

collecting a first portion of the content properties using an inspective agent of a proxy device through an application programming interface to the cloud-based file storage service; and collecting a second portion of the content properties using a client agent installed locally on client devices that manipulate the files stored on the cloud-based file storage service, the cloud-based file storage service supports manipulation by creating, editing, and sharing the files, and the collected content properties include at least one of a computed entropy or layered entropy, a locality-sensitive hashing (LSH), and an indication of an occurrence of a stub;

storing the collected content properties as historical content properties in a historical content properties storage, wherein the historical content properties storage is separate from and not under control of the cloud-based file storage service;

detecting multiple artifacts of the ransomware attack resulting from ransomware manipulation of the files, the detecting including:

comparing at least one of the computed entropy or layered entropy, the LSH, and the indication of the occurrence of the stub included in the historical content properties to respective at least one of the computed entropy or layered entropy, the LSH, and the indication of the occurrence of the stub included in current content properties of the files to identify a volume of changes in the files, and detecting that the identified volume of changes exceeds a predetermined change volume to determine that the ransomware attack is in progress;

identifying a user and/or client device of the client devices that manipulated the files exhibiting the multiple artifacts; and responding to the determination that the ransomware attack is in progress, the responding comprising:

restricting further manipulation of other files on the cloud-based file storage service by the identified user and/or client device.

10. The method of claim 9, wherein:
the collecting the content properties further comprises collecting a third portion of the content properties using an active agent of the proxy device; and
the proxy device is positioned between the client devices and the cloud-based file storage service.

11. The method of claim 9, wherein the identified volume of changes are identified by determining a hamming distance between the LSH for the current content properties and the LSH for the historical content properties.

12. The method of claim 9, wherein the responding further comprises:
calculating an entropy of the payloads of the files;
comparing the entropy of the payloads of the files with entropies of known user-initiated encryption techniques to determine whether or not the identified user and/or client device has implemented a user-initiated encryption technique;
identifying each of the files for which the identified user and/or client device has implemented the user-initiated encryption technique;
determining that the ransomware attack is in process by analyzing the current content properties of the files and the historical content properties of the files, excluding the files for which the identified user and/or client device has implemented the user-initiated encryption technique, to identify the volume of changes between the current content properties and the historical content properties of the files that exceeds the predetermined change volume; and
determining that the ransomware attack is in process by analyzing (i) the current content properties of the files, excluding the files for which the identified user and/or client device has implemented the user-initiated encryption technique, and (ii) known patterns of malicious content properties that indicate a known malicious file modification to identify a match between the current content properties of the files, excluding the files for which the identified user and/or client device has implemented the user-initiated encryption technique, and the known patterns of malicious content properties.

13. A method of detecting a ransomware attack impacting a cloud-based file storage service, the method comprising:
collecting metadata on files stored on the cloud-based file storage service, wherein:
the collecting the metadata comprises:
collecting a first portion of the metadata using an inspective agent of a proxy device through an application programming interface to the cloud-based file storage service; and
collecting a second portion of the metadata using a client agent installed locally on client devices that manipulate the files stored on the cloud-based file storage service,
the cloud-based file storage service supports manipulation by creating, editing, and sharing the files, and
the collected metadata includes at least one of an extension of a file name, a magic number, and a size;
storing the collected metadata as historical metadata in a historical metadata storage, wherein the historical metadata storage is separate from and not under control of the cloud-based file storage service;
detecting multiple artifacts of the ransomware attack resulting from ransomware manipulation of the files, the detecting including:
determining whether the historical metadata exists for the files and a pattern of current metadata for the files, and
determining that the ransomware attack is in progress when (i) the historical metadata does not exist for one or more of the files and (ii) the pattern of the current metadata of the one or more of the files corresponds to a known pattern of malicious metadata;
identifying a user and/or client device of the client devices that manipulated the files exhibiting the multiple artifacts; and
responding to the detection of the ransomware attack, the responding comprising:
restricting further manipulation of other files on the cloud-based file storage service by the identified user and/or client device.

14. The method of claim 13, wherein the responding further comprises:
notifying the user and/or client device that the ransomware attack is in progress; and
providing a location of the ransomware attack to the user and/or client device.

15. The method of claim 13, wherein the responding further comprises:
isolating the cloud-based file storage service the isolating comprising:
disconnecting the identified user and/or client device from the cloud-based file storage service, and
disconnecting additional users who have access to the cloud-based file storage service; and
preventing the identified user and/or client device from accessing the cloud-based file storage service.

16. The method of claim 13, wherein the responding further comprises at least one of performing a backup of the files and performing a backup of the cloud-based file storage service on which the files are stored.

17. The method of claim 13, wherein the responding further comprises:
forcing the identified user and/or client device to perform a local scan for the ransomware attack;
forcing a scan for the ransomware attack on any other cloud-based file storage service for which the identified user and/or client device has access;
forcing additional users who have access to the cloud-based file storage service to perform the local scan for the ransomware attack; and
forcing a scan for the ransomware attack on any other cloud-based file storage service for which the additional users have access.

18. The method of claim 13, wherein:
the responding further comprises restoring a previous backup of the cloud-based file storage service; and
the restoring of the previous backup is automated or performed with user interaction.

19. The method of claim 13, wherein the responding further comprises:
determining a creator of a file having caused the ransomware attack to be initiated on the identified user and/or client device based on the current metadata and the historical metadata; and
identifying and performing a specific response mechanism of multiple response mechanisms based on the determined creator.

20. The method of claim 13, wherein:
the collecting the metadata further comprises collecting a third portion of the metadata using an active agent of the proxy device; and
the proxy device is positioned between the client devices and the cloud-based file storage service.

\* \* \* \* \*